United States Patent
Abotabl et al.

(10) Patent No.: US 12,381,703 B2
(45) Date of Patent: **\*Aug. 5, 2025**

(54) FULL DUPLEX COMMUNICATION TECHNIQUES

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Huilin Xu, Temecula, CA (US); Wanshi Chen, San Diego, CA (US); Krishna Kiran Mukkavilli, San Diego, CA (US); Tingfang Ji, San Diego, CA (US); Shimman Arvind Patel, San Diego, CA (US)

(73) Assignee: QUALCOMM Incorporated, San Diego, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/425,697

(22) Filed: Jan. 29, 2024

(65) Prior Publication Data

US 2024/0171364 A1    May 23, 2024

Related U.S. Application Data

(63) Continuation of application No. 17/204,644, filed on Mar. 17, 2021, now Pat. No. 11,916,848.
(Continued)

(51) Int. Cl.
*H04L 5/14*     (2006.01)
*H04W 72/0446*  (2023.01)

(52) U.S. Cl.
CPC ........... *H04L 5/14* (2013.01); *H04W 72/0446* (2013.01)

(58) Field of Classification Search
CPC ............................. H04L 5/14; H04W 72/0446
See application file for complete search history.

(56) References Cited

U.S. PATENT DOCUMENTS

| | | | |
|---|---|---|---|
| 11,659,531 B2* | 5/2023 | Lei ........................ | H04L 1/1896 370/329 |
| 11,743,865 B2* | 8/2023 | Abotabl ............ | H04W 72/1263 370/329 |

(Continued)

FOREIGN PATENT DOCUMENTS

| | | |
|---|---|---|
| EP | 3737137 A1 | 11/2020 |
| WO | WO-2019170151 A1 | 9/2019 |

(Continued)

OTHER PUBLICATIONS

"3rd Generation Partnership Project, Technical Specification Group Radio Access Network, NR, Physical Layer Procedures for Control (Release 15)", 3GPP Standard, Technical Specification, 3GPP TS 38.213, 3rd Generation Partnership Project (3GPP), Mobile Competence Centre, 650, Route Des Lucioles, F-06921, Sophia-Antipolis Cedex, France, vol. RAN WG1, No. V15.8.0, (Dec. 2019), Jan. 11, 2020, pp. 1-109, XP051860646, chapter 10, p. 61.

(Continued)

*Primary Examiner* — Bailor C Hsu
(74) *Attorney, Agent, or Firm* — Qualcomm/Norton Rose Fulbright US LLP

(57) ABSTRACT

Full-duplex communication techniques are described. Some aspects may utilize full-duplex-slot formats, such as may be provided in addition to or in the alternative to uplink, downlink, and flexible slot formats. A full-duplex slot implemented in accordance with a full-duplex-slot format provides a slot in which the frequency band may be used for both uplink and downlink transmissions. Downlink and/or uplink transmissions of a full-duplex slot may occur in overlapping frequency bands or in adjacent frequency (Continued)

bands. A first wireless device may transmit slot signaling comprising one or more full-duplex-slot-indicator parameters. A second wireless device may base one or more full-duplex slot configuration determinations on a full-duplex-slot configuration. The second wireless device may apply one or more full-duplex-slot-indicator-parameter rules with respect to full-duplex-slot-indicator parameters for determining a full-duplex-slot format. Other aspects and features are also claimed and described.

19 Claims, 12 Drawing Sheets

Related U.S. Application Data

(60) Provisional application No. 62/991,235, filed on Mar. 18, 2020.

(56) References Cited

U.S. PATENT DOCUMENTS

| | | | |
|---|---|---|---|
| 11,889,537 B2* | 1/2024 | Zhang | H04W 72/0446 |
| 12,143,342 B2* | 11/2024 | Zhang | H04W 72/23 |
| 2017/0332396 A1 | 11/2017 | Liao et al. | |
| 2018/0367289 A1 | 12/2018 | Kim et al. | |
| 2019/0053227 A1* | 2/2019 | Huang | H04L 25/03006 |
| 2019/0059084 A1 | 2/2019 | Lee et al. | |
| 2019/0149269 A1 | 5/2019 | Chatterjee et al. | |
| 2019/0149380 A1 | 5/2019 | Babaei et al. | |
| 2019/0199422 A1 | 6/2019 | Li et al. | |
| 2019/0230689 A1 | 7/2019 | Cao et al. | |
| 2019/0342898 A1 | 11/2019 | Nam et al. | |
| 2019/0349180 A1 | 11/2019 | Lu et al. | |
| 2020/0053728 A1 | 2/2020 | Huang et al. | |
| 2021/0135770 A1 | 5/2021 | Schober et al. | |
| 2021/0203469 A1 | 7/2021 | Abedini et al. | |
| 2021/0297226 A1 | 9/2021 | Abotabl et al. | |
| 2021/0329660 A1 | 10/2021 | Zhang et al. | |
| 2022/0393847 A1 | 12/2022 | Moon et al. | |
| 2023/0143578 A1 | 5/2023 | Lin | |
| 2023/0145355 A1* | 5/2023 | Lin | H04L 5/1469 370/278 |
| 2023/0180224 A1* | 6/2023 | Rudolf | H04W 72/0446 |
| 2023/0292294 A1* | 9/2023 | Rudolf | H04L 5/14 |
| 2023/0362898 A1* | 11/2023 | Jeon | G01S 7/0235 |
| 2024/0039655 A1* | 2/2024 | Rudolf | H04L 1/0016 |
| 2024/0224246 A1* | 7/2024 | Zhang | H04L 5/0094 |

FOREIGN PATENT DOCUMENTS

| WO | WO-2020040530 A1 | 2/2020 |
|---|---|---|
| WO | WO-2020146512 A1 | 7/2020 |

OTHER PUBLICATIONS

ETSI TS 138 213, "5G, NR, Physical Layer Procedures for Control (Release 15)", 3GPP TS 38.213, v15.12.0, Jan. 2021, 113 pages.
International Preliminary Report On Patentability—PCT/US2021/022951—The International Bureau of WIPO—Geneva, Switzerland—Sep. 29, 2022.
International Search Report and Written Opinion—PCT/US2021/022951—ISA/EPO—Jun. 9, 2021.

* cited by examiner

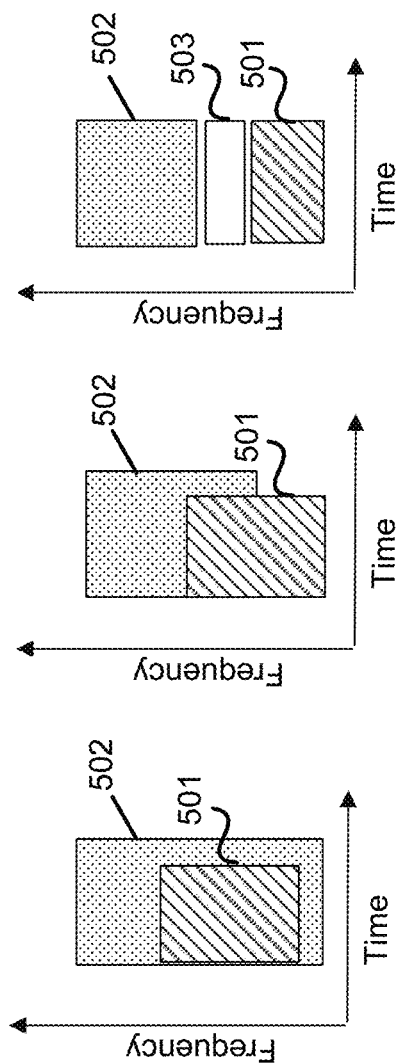

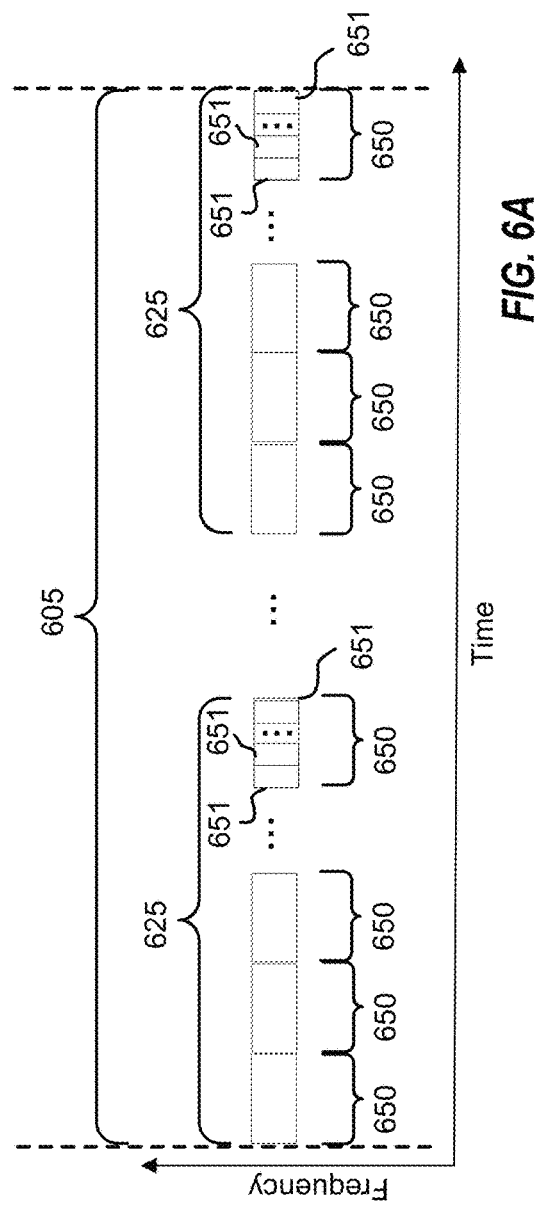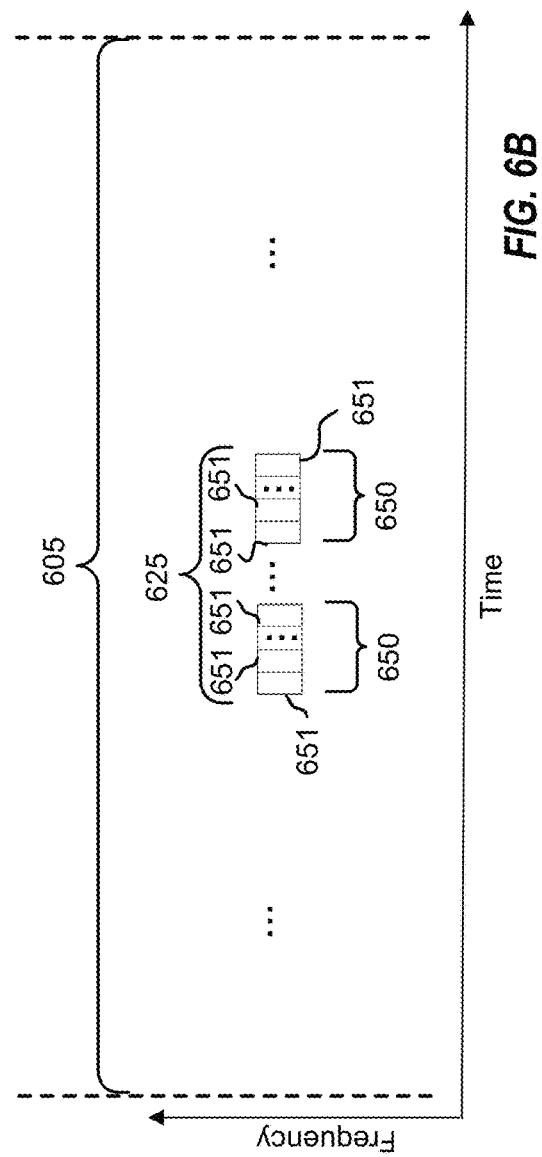

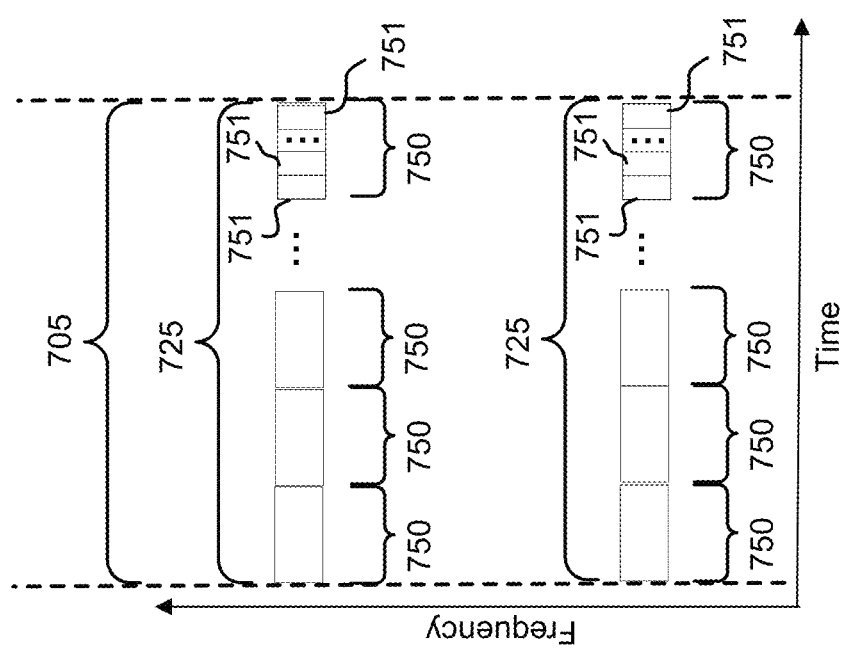

FULL DUPLEX COMMUNICATION TECHNIQUES

CROSS-REFERENCE TO RELATED APPLICATIONS

This application is a continuation and claims the benefit of priority U.S. patent application Ser. No. 17/204,644, entitled, "FULL DUPLEX COMMUNICATION TECHNIQUES," filed Mar. 17, 2021, and also claims the benefit of U.S. Provisional Patent Application No. 62/991,235, entitled, "FULL DUPLEX SLOT FORMAT," filed on Mar. 18, 2020, the disclosures of which are hereby incorporated by reference herein in their entirety as if fully set forth below and for all applicable purposes.

TECHNICAL FIELD

Aspects of the present disclosure relate generally to wireless communication systems, and more particularly, to full-duplex slot formats. Certain deployments and embodiments of the technology discussed below can enable and provide a full-duplex-slot format configured to dynamically contain downlink only symbols, uplink only symbols, or full-duplex symbols (e.g., downlink, uplink, sidelink communications, and/or other communication links). Disclosed techniques mitigate interference, enable various band-type duplex communications, and can be leveraged in various spectrum scenarios.

INTRODUCTION

Wireless communication networks are widely deployed to provide various communication services such as voice, video, packet data, messaging, broadcast, and the like. These wireless networks may be multiple-access networks capable of supporting communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grow with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. The method may include communicating full-duplex-slot signaling designating use of a full-duplex-slot format configured to dynamically comprise downlink only symbols, uplink only symbols, or full-duplex symbols. The full-duplex-slot signaling may indicate one or more symbols of a full-duplex slot as downlink only symbols, uplink only symbols, or full-duplex symbols. The method may also include communicating one or more symbols of a wireless communication using the full-duplex-slot format.

In an additional aspect of the disclosure, an apparatus configured for wireless communication is provided. The apparatus may include means for communicating full-duplex-slot signaling designating use of a full-duplex-slot format configured to dynamically comprise downlink only symbols, uplink only symbols, or full-duplex symbols. The full-duplex-slot signaling may indicate one or more symbols of a full-duplex slot as downlink only symbols, uplink only symbols, or full-duplex symbols. The apparatus may also include means for communicating one or more symbols of a wireless communication using the full-duplex-slot format.

In an additional aspect of the disclosure, a non-transitory computer-readable medium having program code recorded thereon for wireless communication is provided. The program code may include code to communicate full-duplex-slot signaling designating use of a full-duplex-slot format configured to dynamically comprise downlink only symbols, uplink only symbols, or full-duplex symbols. The full-duplex-slot signaling may indicate one or more symbols of a full-duplex slot as downlink only symbols, uplink only symbols, or full-duplex symbols. The program code may also include code to communicate one or more symbols of a wireless communication using the full-duplex-slot format.

In an additional aspect of the disclosure, an apparatus configured for wireless communication is disclosed. The apparatus includes at least one processor, and a memory coupled to the processor. The processor may be configured to communicate full-duplex-slot signaling designating use of a full-duplex-slot format configured to dynamically comprise downlink only symbols, uplink only symbols, or full-duplex symbols. The full-duplex-slot signaling may indicate one or more symbols of a full-duplex slot as downlink only symbols, uplink only symbols, or full-duplex symbols. The processor may also be configured to communicate one or more symbols of a wireless communication using the full-duplex-slot format.

In an additional aspect of the disclosure, a device including a communications interface configured for wireless communication is provided. The communications interface may be configured to communicate full-duplex-slot signaling designating use of a full-duplex-slot format configured to dynamically comprise downlink only symbols, uplink only symbols, or full-duplex symbols. The full-duplex-slot signaling may indicate one or more symbols of a full-duplex slot as downlink only symbols, uplink only symbols, or full-duplex symbols. The communications interface may also be configured to communicate one or more symbols of a wireless communication using the full-duplex-slot format.

In an additional aspect of the disclosure, a method of wireless communication is provided. The method may include transmitting full-duplex-slot signaling designating use of a full-duplex-slot format configured to dynamically contain downlink only symbols, uplink only symbols, or full-duplex symbols. The full-duplex-slot signaling may indicate one or more symbols of a full-duplex slot as downlink only symbols, uplink only symbols, or full-duplex symbols. The method may also include communicating one or more symbols of the wireless communication using the full-duplex-slot format.

In an additional aspect of the disclosure, an apparatus configured for wireless communication is provided. The apparatus may include means for transmitting full-duplex-slot signaling designating use of a full-duplex-slot format configured to dynamically contain downlink only symbols, uplink only symbols, or full-duplex symbols. The full-duplex-slot signaling may indicate one or more symbols of a full-duplex slot as downlink only symbols, uplink only symbols, or full-duplex symbols. The apparatus may also include means for communicating one or more symbols of the wireless communication using the full-duplex-slot format.

In an additional aspect of the disclosure, a non-transitory computer-readable medium having program code recorded thereon for wireless communication is provided. The program code may include code to transmit full-duplex-slot signaling designating use of a full-duplex-slot format configured to dynamically contain downlink only symbols, uplink only symbols, or full-duplex symbols. The full-duplex-slot signaling may indicate one or more symbols of a full-duplex slot as downlink only symbols, uplink only symbols, or full-duplex symbols. The program code may also include code to communicate one or more symbols of the wireless communication using the full-duplex-slot format.

In an additional aspect of the disclosure, an apparatus configured for wireless communication is disclosed. The apparatus includes at least one processor, and a memory coupled to the processor. The processor may be configured to transmit full-duplex-slot signaling designating use of a full-duplex-slot format configured to dynamically contain downlink only symbols, uplink only symbols, or full-duplex symbols. The full-duplex-slot signaling may indicate one or more symbols of a full-duplex slot as downlink only symbols, uplink only symbols, or full-duplex symbols. The processor may also be configured to communicate one or more symbols of the wireless communication using the full-duplex-slot format.

In accordance with aspects of the disclosure, the foregoing systems, methods, and apparatuses may be implemented in combination with one or more additional features, such as the following features whether alone or in combination. For example, the above systems, methods, and apparatuses may include the full-duplex-slot signaling indicating the one or more symbols as full-duplex symbols. The above systems, methods, and apparatuses may include the one or more symbols comprising in-band full-duplex symbols transmitted in overlapping frequency bands. The above systems, methods, and apparatuses may include the one or more symbols comprising sub-band full-duplex symbols transmitted in non-overlapping frequency bands. The above systems, methods, and apparatuses may include communicating the one or more symbols using the full-duplex-slot format comprising transmitting a first symbol of the one or more symbols to a first half-duplex user equipment (UE) in the full-duplex slot, and receiving a second symbol of the one or more symbols from a second half-duplex UE in the full-duplex slot. The above systems, methods, and apparatuses may include communicating the one or more symbols using the full-duplex-slot format comprising transmitting a first symbol of the one or more symbols to a full-duplex UE in the full-duplex slot, and receiving a second symbol of the one or more symbols from the full-duplex UE in the full-duplex slot. The above systems, methods, and apparatuses may include the full-duplex-slot signaling indicating the one or more symbols as downlink symbols, and communicating the one or more symbols using the full-duplex-slot format comprising transmitting the one or more symbols to one or more UEs. The above systems, methods, and apparatuses may include the full-duplex-slot signaling indicating the one or more symbols as uplink symbols, and communicating the one or more symbols using the full-duplex-slot format comprising receiving the one or more symbols from one or more UEs. The above systems, methods, and apparatuses may include the full-duplex-slot signaling including a full-duplex-slot-format-indicator parameter configured to override a flexible slot of the wireless communication with the full-duplex slot and to indicate the one or more symbols of the full-duplex slot as full-duplex symbols. The above systems, methods, and apparatuses may include the full-duplex-slot signaling including a full-duplex-dedicated-configuration parameter and a full-duplex-slot-format-indicator parameter configured to override a flexible slot of the wireless communication with the full-duplex slot and to indicate the one or more symbols of the full-duplex slot as downlink only symbols, uplink only symbols, or full-duplex symbols. The above systems, methods, and apparatuses may include the full-duplex-slot signaling including a full-duplex-common-configuration parameter, a full-duplex-dedicated-configuration parameter, and a full-duplex-slot-format-indicator parameter configured to indicate the one or more symbols of the full-duplex slot as downlink only symbols, uplink only symbols, or full-duplex symbols of the full-duplex slot or to indicate symbols as symbols of a flexible slot. The above systems, methods, and apparatuses may include the full-duplex-slot signaling indicating that another slot format is being overridden with the full-duplex-slot format. The above systems, methods, and apparatuses may include the overridden slot format being a single slot format. The above systems, methods, and apparatuses may include the single slot formation being a flexible slot format. The above systems, methods, and apparatuses may include the overridden slot format including a plurality of slot formats. The above systems, methods, and apparatuses may include the plurality of slot formats including a flexible slot format and at least one of a uplink slot format or a downlink slot format. The above systems, methods, and apparatuses may include communicating the one or more symbols using the full-duplex-slot format being performed between downlink and uplink slots of time division duplex (TDD) frame. The above systems, methods, and apparatuses may include communicating the one or more symbols using the full-duplex-slot format may be performed anywhere in a time division duplex (TDD) frame. The above systems, methods, and apparatuses may include the full-duplex-slot signaling including a plurality of slot-format-indication parameters. The above systems, methods, and apparatuses may include the plurality of slot-format-indication parameters including a first slot-format-indication parameter for downlink symbols and a second slot-format-indication parameter for uplink symbols. The above systems, methods, and apparatuses may include the first and second slot-format-indication parameters each being configured to indicate either downlink symbol, uplink symbol, flexible symbol, or reserved symbol. The above systems, methods, and apparatuses may include the first slot-format-indication parameter being set as reserved symbol and the full-duplex slot is indicated as not allowed for at least one of uplink or downlink symbols. The above systems, methods, and apparatuses may include the first slot-format-indication parameter being set as reserved symbol and the full-duplex slot is indicated according to the second slot-format-indication parameter. The above systems, methods, and apparatuses may include the first slot-format-indication parameter being set as flexible symbol and the full-duplex slot is indicated according to the second slot-format-indication parameter. The above systems, methods, and apparatuses may include the full-duplex slot being indicated by the first slot-format-indication parameter set as one of either downlink symbol or uplink symbol and the second slot-format-indication parameter set as a second the other one of the uplink symbol.

In one aspect of the disclosure, a method of wireless communication is provided. The method may include receiving full-duplex-slot signaling designating use of a full-duplex-slot format configured to dynamically contain downlink only symbols, uplink only symbols, or full-duplex symbols. The full-duplex-slot signaling may indicate one or more symbols of a full-duplex slot as downlink only symbols, uplink only symbols, or full-duplex symbols. The method may also include communicating one or more symbols of the wireless communication using the full-duplex-slot format.

In an additional aspect of the disclosure, an apparatus configured for wireless communication is provided. The apparatus may include means for receiving full-duplex-slot signaling designating use of a full-duplex-slot format configured to dynamically contain downlink only symbols, uplink only symbols, or full-duplex symbols. The full-duplex-slot signaling indicates one or more symbols of a full-duplex slot as downlink only symbols, uplink only symbols, or full-duplex symbols. The apparatus may also include means for communicating one or more symbols of the wireless communication using the full-duplex-slot format.

In an additional aspect of the disclosure, a non-transitory computer-readable medium having program code recorded thereon for wireless communication is provided. The program code may include code to receive full-duplex-slot signaling designating use of a full-duplex-slot format configured to dynamically contain downlink only symbols, uplink only symbols, or full-duplex symbols. The full-duplex-slot signaling may indicate one or more symbols of a full-duplex slot as downlink only symbols, uplink only symbols, or full-duplex symbols. The program code may also include code to communicate one or more symbols of the wireless communication using the full-duplex-slot format.

In an additional aspect of the disclosure, an apparatus configured for wireless communication is disclosed. The apparatus includes at least one processor, and a memory coupled to the processor. The processor may be configured to receive full-duplex-slot signaling designating use of a full-duplex-slot format configured to dynamically contain downlink only symbols, uplink only symbols, or full-duplex symbols. The full-duplex-slot signaling indicates one or more symbols of a full-duplex slot as downlink only symbols, uplink only symbols, or full-duplex symbols. The processor may also be configured to communicate one or more symbols of the wireless communication using the full-duplex-slot format.

In accordance with aspects of the disclosure, the foregoing systems, methods, and apparatuses may be implemented in combination with one or more additional features, such as the following features whether alone or in combination. For example, the above systems, methods, and apparatuses may include the full-duplex-slot signaling indicating the one or more symbols as full-duplex symbols. The above systems, methods, and apparatuses may include symbols of the full-duplex slot comprising in-band full-duplex symbols transmitted in overlapping frequency bands. The above systems, methods, and apparatuses may include symbols of the full-duplex slot comprising sub-band full-duplex symbols transmitted in non-overlapping frequency bands. The above systems, methods, and apparatuses may include communicating the one or more symbols using the full-duplex-slot format comprising transmitting, by a first half-duplex UE, a first symbol of the one or more symbols in the full-duplex slot. The above systems, methods, and apparatuses may include communicating the one or more symbols using the full-duplex-slot format comprising transmitting, a full-duplex UE, a first symbol of the one or more symbols in the full-duplex slot, and receiving, by the full-duplex UE, a second symbol of the one or more symbols in the full-duplex slot. The above systems, methods, and apparatuses may include the full-duplex-slot signaling indicating the one or more symbols as downlink symbols, and communicating the one or more symbols using the full-duplex-slot format comprising receiving the one or more symbols. The above systems, methods, and apparatuses may include the full-duplex-slot signaling indicating the one or more symbols as uplink symbols, and communicating the one or more symbols using the full-duplex-slot format comprising transmitting the one or more symbols. The above systems, methods, and apparatuses may include the full-duplex-slot signaling including a full-duplex-slot-format-indicator parameter configured to override a flexible slot of the wireless communication with the full-duplex slot and to indicate the one or more symbols of the full-duplex slot as full-duplex symbols. The above systems, methods, and apparatuses may include the full-duplex-slot signaling including a full-duplex-dedicated-configuration parameter and a full-duplex-slot-format-indicator parameter configured to override a flexible slot of the wireless communication with the full-duplex slot and to indicate the one or more symbols of the full-duplex slot as downlink only symbols, uplink only symbols, or full-duplex symbols. The above systems, methods, and apparatuses may include the full-duplex-slot signaling including a full-duplex-common-configuration parameter, a full-duplex-dedicated-configuration parameter, and a full-duplex-slot-format-indicator parameter configured to indicate the one or more symbols of the full-duplex slot as downlink only symbols, uplink only symbols, or full-duplex symbols of the full-duplex slot or to indicate symbols as symbols of a flexible slot. The above systems, methods, and apparatuses may include the full-duplex-slot signaling indicating that another slot format is being overridden with the full-duplex-slot format. The above systems, methods, and apparatuses may include the overridden slot format including a single slot format. The above systems, methods, and apparatuses may include the single slot format being a flexible slot format. The above systems, methods, and apparatuses may include the overridden slot format including a plurality of slot formats. The above systems, methods, and apparatuses may include the plurality of slot formats including a flexible slot format and at least one of a uplink slot format or a downlink slot format. The above systems, methods, and apparatuses may include the communicating the one or more symbols using the full-duplex-slot format being performed between downlink and uplink slots of TDD frame. The above systems, methods, and apparatuses may include the communicating the one or more symbols using the full-duplex-slot format being performed anywhere in TDD frame. The above systems, methods, and apparatuses may include the full-duplex-slot signaling including a plurality of slot-format-indication parameters. The above systems, methods, and apparatuses may include the plurality of slot-format-indication parameters including a first slot-format-indication parameter for downlink symbols and a second slot-format-indication parameter for uplink symbols. The above systems, methods, and apparatuses may include the first and second slot-format-indication parameters are each configured to indicate either downlink symbol, uplink symbol, flexible symbol, or reserved symbol. The above systems, methods, and apparatuses may include the first slot-format-indication parameter being set as reserved symbol and the full-duplex slot is indicated as not allowed for at least one of uplink or downlink symbols. The above systems, methods, and apparatuses may include the first slot-format-indication parameter being set as reserved symbol and the full-duplex slot is indicated according to the second slot-format-indication parameter. The above systems, methods, and apparatuses may include the first slot-format-indication parameter being set as flexible symbol and the full-duplex slot is indicated according to the second slot-format-indication parameter. The above systems, methods, and apparatuses may include the full-duplex slot being indicated by the first slot-format-indication parameter set as one of either downlink symbol or uplink symbol and the second slot-format-indication parameter set as a second the other one of the uplink symbol.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 5A-5C illustrate various configurations of full-duplex modes as may be utilized by wireless communication stations according to some aspects of the present disclosure.

FIGS. 6A and 6B show an example TDD frame structure (including downlink and uplink subframes) as may be utilized according to some aspects of the present disclosure.

FIG. 7 shows an example FDD frame structure (including downlink and uplink subframes) as may be utilized according to some aspects of the present disclosure.

DETAILED DESCRIPTION

Figure 1:
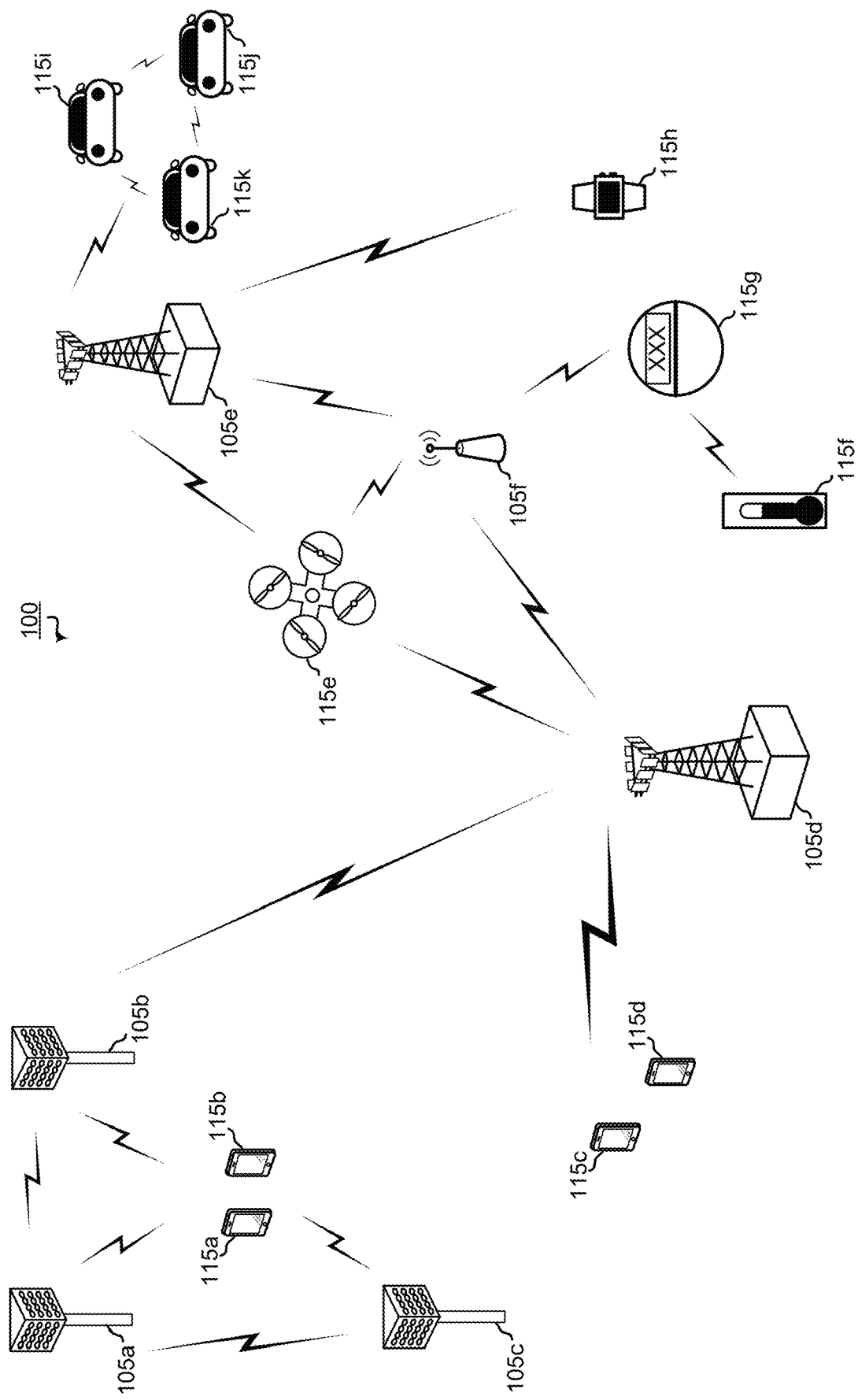
FIG. 1 is a block diagram illustrating example details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3$^{rd}$ Generation Partnership Project" (3GPP), and cdma2000 is described in documents from an organization named "3$^{rd}$ Generation Partnership Project 2" (3GPP2). These various radio technologies and standards are known or are being developed. For example, the 3$^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD/TDD implementations, subcarrier spacing may occur with 15 kHz, for example over 1, 5, 10, 20 MHz, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the $3^{rd}$ Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IOT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IOT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105c, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
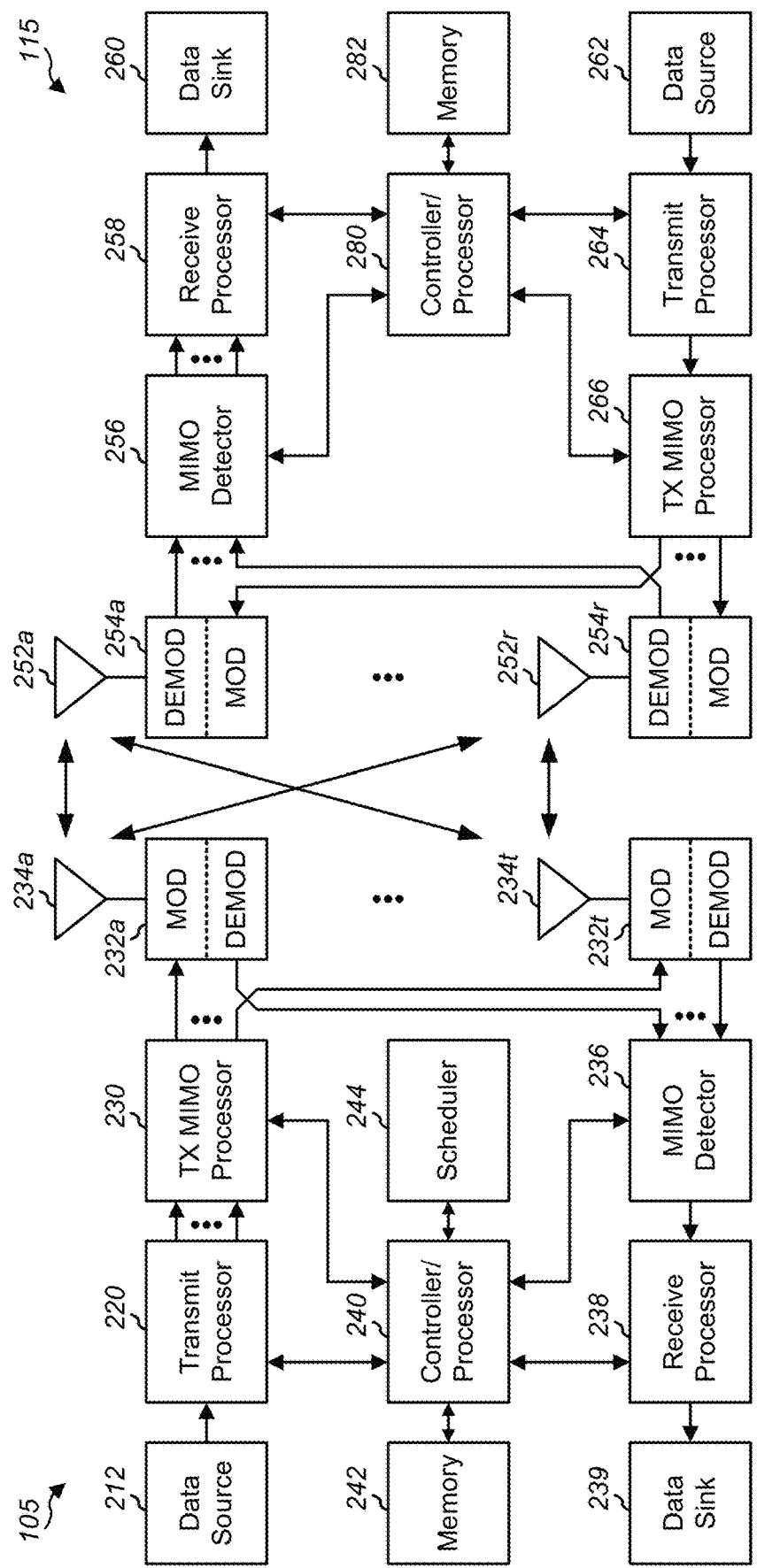
FIG. 2 is a block diagram conceptually illustrating an example design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 9 and 10, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of wireless network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In wireless network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
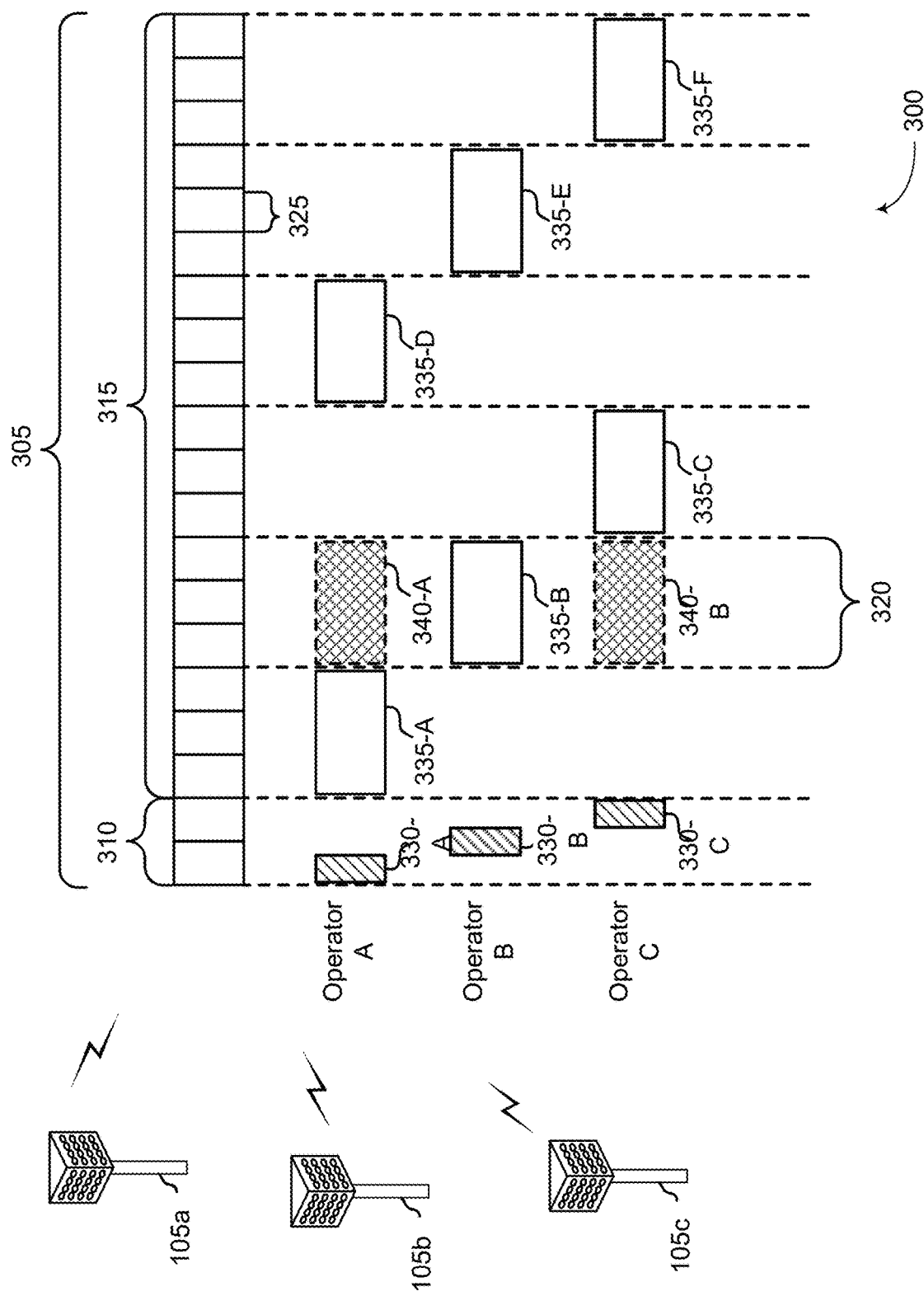
FIG. 3 is a block diagram illustrating an example of timing for resource partitioning as may be implemented by wireless communication stations according to some aspects of the present disclosure.

FIG. 3 illustrates an example of timing diagram 300 for resource partitioning. Timing diagram 300 includes a superframe 305, which may represent a fixed duration of time (e.g., 20 ms). Superframe 305 may be repeated for a given communication session and may be used by a wireless system such as wireless network 100 described with reference to FIG. 1. Superframe 305 may be divided into intervals such as an acquisition interval (A-INT) 310 and an arbitration interval 315. As described in more detail below, A-INT 310 and arbitration interval 315 may be subdivided into sub-intervals, designated for certain resource types, and allocated to different network operating entities to facilitate coordinated communications between the different network operating entities. For example, arbitration interval 315 may be divided into a plurality of sub-intervals 320. Also, superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using superframe 305 for coordinated communications may be greater than or fewer than the number illustrated in timing diagram 300.

A-INT 310 may be a dedicated interval of superframe 305 that is reserved for exclusive communications by the network operating entities. In some examples, each network operating entity may be allocated certain resources within A-INT 310 for exclusive communications. For example, resources 330-*a* may be reserved for exclusive communications by Operator A, such as through base station 105*a*, resources 330-*b* may be reserved for exclusive communications by Operator B, such as through base station 105*b*, and resources 330-*c* may be reserved for exclusive communications by Operator C, such as through base station 105*c*. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g., UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B, (e.g., G-INT-OpB), resources 335-*c* (e.g., G-INT-OpC) may be prioritized for Operator C, resources 335-*d* may be prioritized for Operator A, resources 335-*e* may be prioritized for Operator B, and resources 335-*f* may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within superframe 305. This partitioning of data may be an example of time division multiplexing (TDM). Also, when resources appear in the same sub-interval (e.g., resources 340-*a* and resources 335-*b*), these resources represent the same time resources with respect to superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT (e.g., resources 335-*b*), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-*b* (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (COMP) communications. For example an operating entity may employ COMP and dynamic time division duplex (TDD) in a G-INT and opportunistic COMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or sub-intervals 320 may alternate between G-INTs for that network operating entity and O-INTs to allow other network operating entities to enter. If there are two network operating entities, sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Wireless devices of wireless network 100 may use various duplex modes for communications. For example, a wireless device may implement a full-duplex mode or a half-duplex mode with respect to any particular communication link. When operating according to a half-duplex mode, a wireless device communicates in one link direction (e.g., uplink or downlink) at a time. Slot formats (e.g., the slot formats of Table 11.1.1-1 of 3GPP TS 28.213 version 15.3.0 5G NR Release 15, the disclosure of which is hereby incorporated herein by reference) utilized with respect to half-duplex modes provide for symbol (e.g., pulses in digital baseband transmission or tones in passband transmission) transmission within a slot only in that link direction (e.g., uplink slot/symbol or downlink slot/symbol). For example, the full bandwidth of a bandwidth part (BWP) of a component carrier allocated for the uplink or downlink communication is used for the respective uplink or downlink symbol transmission. When operating according to a full-duplex mode, a wireless device communicates via both the uplink and downlink (e.g., uplink and downlink transmissions divided by time and/or frequency). Slot formats (e.g., the slot formats of Table 11.1.1-1 identified above) utilized with respect to full-duplex modes provide for symbol transmission only in one link direction (e.g., uplink symbol or downlink symbol).

Figure 4B:
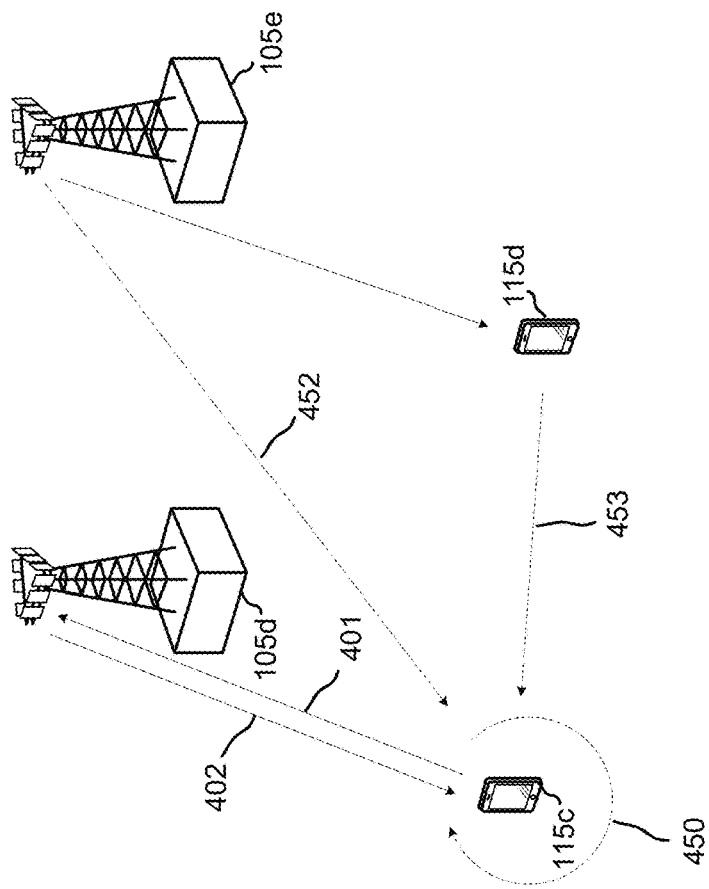
FIGS. 4A-4C illustrate example full-duplex wireless communications modes according to some aspects of the present disclosure.
Figure 4A:
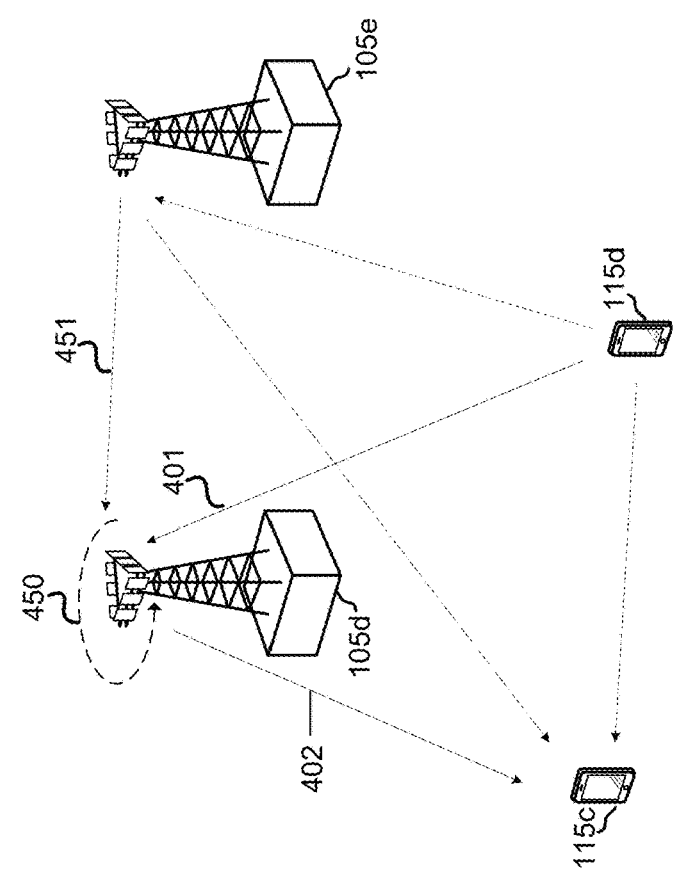
Figure 4C:
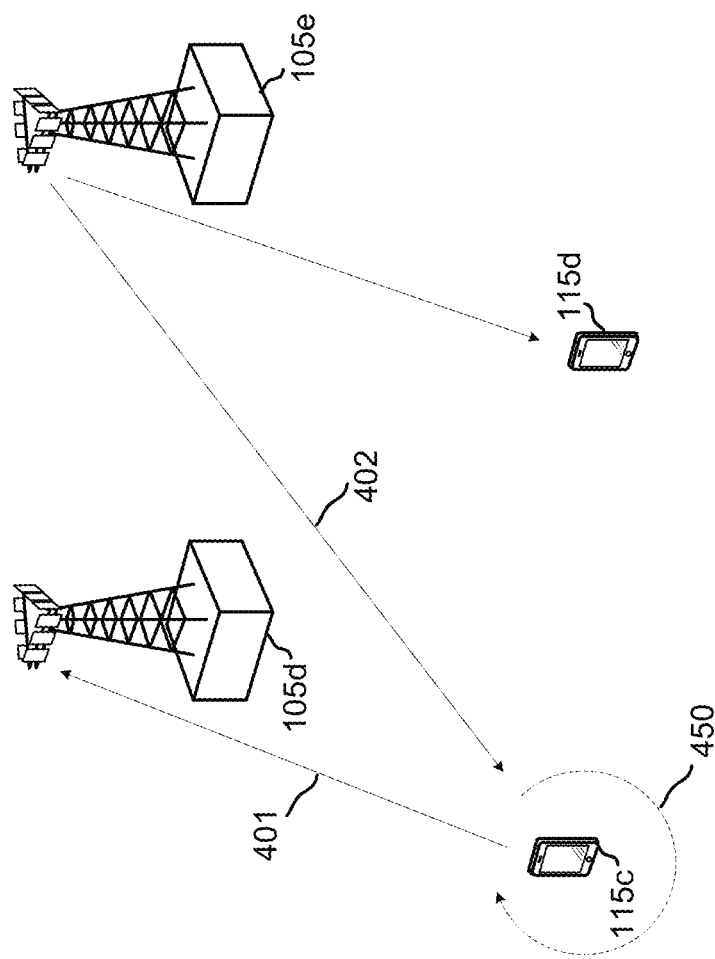

FIGS. 4A-4C illustrate examples in which full-duplex wireless communications modes are implemented by at least one wireless device of particular communication links. It should be appreciated that FIGS. 4A-4C represent a portion of wireless network 100 selected for illustrating full-duplex communications and that the particular base stations and UEs depicted are not intended to be limiting with respect to the various wireless communication stations that may operate in a full-duplex communication mode or that may implement full-duplex slot formats according to concepts of the disclosure.

In the example of FIG. 4A, base stations 105d and 105e are each operating in a full-duplex mode while UEs 115c and 115d are each operating in a half-duplex mode. In this example, base station 105d receives uplink signal 401 and transmits downlink signal 402 using a shared time resource, and possibly a shared frequency resource. Correspondingly, UE 115d transmits uplink signal 401 and UE 115c receives downlink signal 402 sharing a time resource, and possibly sharing a frequency resource. Base station 105d may experience self-interference 450 associated with transmission of downlink signal 402 when attempting to receive uplink signal 401, in addition to external interference (e.g., interference 451 from base station 105e).

In the example of FIG. 4B, base station 105d and UE 115c are each operating in a full-duplex mode. In this example, base station 105d receives uplink signal 401 and transmits downlink signal 402 using a shared time resource, and possibly a shared frequency resource. Correspondingly, UE 115c transmits uplink signal 401 and receives downlink signal 402 using a shared time resource, and possibly a shared frequency resource. In addition to self-interference experienced by base station 105d, as described above, UE 115c may experience self-interference 450 associated with transmission of uplink signal 401 when attempting to receive downlink signal 402, in addition to external interference (e.g., interference 452 from base station 105e and interference 453 from UE 115d).

In the example of FIG. 4C, UE 115c is operating in a full-duplex mode (e.g., implementing a multiple transmission and reception (multi-TRP) architecture). As with the example of FIG. 4B, UE 115c transmits uplink signal 401 and receives downlink signal 402 using a shared time resource, and possibly a shared frequency resource. As described above, UE 115c may experience self-interference 450 associated with transmission of uplink signal 401 when attempting to receive downlink signal 402.

FIGS. 5A-5C illustrate various configurations of full-duplex modes as may be utilized by wireless devices of wireless network 100. It should be appreciated that FIGS. 5A-5C present examples with respect to full-duplex mode configurations that may be utilized and are not intended to be limiting with respect to the particular duplex mode configurations that may be utilized by wireless communication stations that may implement full-duplex slot formats according to concepts of the disclosure.

As can be seen in FIGS. 5A-5C, uplink signals 501 of the full-duplex modes overlap downlink signals 502 in time. That is, a wireless communication station implementing a full-duplex mode with respect to wireless communications transmits and receives at the same time. In contrast, a wireless communication station implementing a half-duplex mode with respect to wireless communications transmits and receives at different times.

Different configurations may be utilized with respect to a full-duplex mode, as represented by the examples of FIGS. 5A-5C. For example, FIGS. 5A and 5B show examples of in-band full-duplex, wherein uplink signals 501 of the full-duplex modes overlap downlink signals 502 in time and frequency. That is the uplink signals and downlink signals at least partially share the same time and frequency resource (e.g., full or partial overlap of the uplink and downlink signals in the time and frequency domains). In another configuration of a full-duplex mode, FIG. 5C shows an example of sub-band full-duplex, wherein uplink signal 501 of the full-duplex mode overlaps downlink signal 502 in time, but not in frequency. That is the uplink signals and downlink signals at least partially share the same time resource (e.g., full or partial overlap of the uplink and downlink signals in the time domain), but do not share the same frequency resource. In the example illustrated in FIG. 5C, uplink signal 501 and downlink signal 502 are separated in the frequency domain by guard band 503 (e.g., a relatively narrow amount of frequency spectrum separating the frequency band occupied by the uplink and downlink signals).

As described above with reference to FIG. 3, self-contained subframes, containing one or more symbols (e.g., 14 symbols), may be a part of a long ITC including downlink and uplink transmission. The subframes may, for example, include one or more slots (e.g., time slots) containing symbols (e.g., each slot of a subframe may contain 14 symbols), wherein the slots may be utilized for uplink or downlink transmission of their respective symbols. Accordingly, 5G wireless networks typically provide an uplink slot format providing for uplink only symbols, a downlink slot format providing for downlink only symbols, and a flexible slot and/or symbol format providing for either uplink only symbols or downlink only symbols.

FIGS. 6A and 6B show an example TDD frame structure including downlink and uplink subframes. For example, frame 605 is shown in FIG. 6A as including subframes 625, such as may correspond to subframes 325 described above with reference to FIG. 3. Each subframe may include one or more slots, shown as slots 650 in the examples of FIGS. 6A and 6B. Each slot 650 may contain one or more symbols 651 for transmission in the downlink or uplink. For example, a first instance of subframe 625 (e.g., left most subframe) in FIG. 6A may comprise a downlink subframe in which the downlink slot format is implemented for slots 650 for downlink only symbols. Correspondingly, a second instance of subframe 625 in FIG. 6A (e.g., right most subframe) may comprise an uplink subframe in which the uplink slot format is implemented for slots 650 for uplink only symbols. Additionally or alternatively, the instance of subframe 625 in FIG. 6B may comprise a flexible subframe in which the flexible slot format is implemented for slots 650 for each individually being downlink only or unlink only slots. A flexible instance of subframe 625 of FIG. 6B may, for example, be disposed in the structure of frame 605 between a downlink instance of subframe 625 and an uplink instance of subframe 625 of FIG. 6A.

The slot format in the examples of FIGS. 6A and 6B may be determined using a predetermined set of parameters. In operation according to 5G NR Release 16, for example, a UE may determine the configuration of slots commonly used by UEs in the wireless network based on the TDD-UL-DL-ConfigurationCommon parameter (e.g., pattern1 alone or pattern1 and pattern2 may be defined by the configuration). Further, a UE may determine the configuration of flexible slots and/or symbols, such as may be dedicated for use by the UE, based on the TDD-UL-DL-ConfigDedicated parameter. A UE may be configured using the SlotFormatCombination parameter to instruct the UE to monitor downlink control information (DCI) format2_0 for slot format indication (SFI) information used to inform the UE whether a slot is downlink, uplink, or flexible.

FIG. 7 shows an example FDD frame structure including downlink and uplink subframes. For example, frame 705 is shown in FIG. 7 as including subframes 725, such as may correspond to subframes 325 described above with reference to FIG. 3. Each subframe may include one or more slots, shown as slots 750 in the examples of FIG. 7. Each slot 750 may contain one or more symbols 751 for transmission in the downlink or uplink. For example, a first instance of subframe 725 in FIG. 7 (e.g., upper subframe) may comprise a downlink subframe in which the downlink slot format is implemented for slots 750 for downlink only symbols. Correspondingly, a second instance of subframe 725 in FIG. 7 (e.g., lower subframe) may comprise an uplink subframe in which the uplink slot format is implemented for slots 750 for uplink only symbols.

The slot format in the example of FIG. 7 may be determined using a predetermined set of parameters. In operation according to 5G NR Release 16 (e.g., 3GPP TS 38.212), for example, the SFI-index field in DCI format 2_0 may be used to indicate, to a UE on a serving cell, a combination of slot formats that includes a combination of slot formats for a reference downlink BWP and a combination of slot formats for a reference uplink BWP of the serving cell.

Embodiments of the present disclosure provide a full-duplex-slot format available for use in addition to or in the alternative to the above described slot formats. A full-duplex slot (also referred to herein as a downlink plus uplink or D+U slot) implemented in accordance with a full-duplex-slot format of aspects of the disclosure is a slot in which the frequency band may be used for both uplink and downlink transmissions. For example, a full-duplex slot implemented according to a full-duplex-slot format of some aspects may contain uplink symbols, downlink symbols, full-duplex symbols, or a combination of any or all of uplink symbols, downlink symbols, and full-duplex symbols (e.g., slot formats similar to those of Table 11.1.1-1 identified above may include full-duplex symbols in addition to or in the alternative to one or more of uplink symbols, downlink symbols, and flexible symbols therein). In accordance with an in-band full-duplex implementation, the downlink and uplink transmissions of a full-duplex slot may occur in overlapping frequency bands (e.g., as shown in the examples of FIGS. 5A and 5B). In accordance with a sub-band full-duplex implementation, the downlink and uplink transmissions of a full-duplex slot may occur in adjacent frequency bands (e.g., as shown in the example of FIG. 5C).

Figure 8:
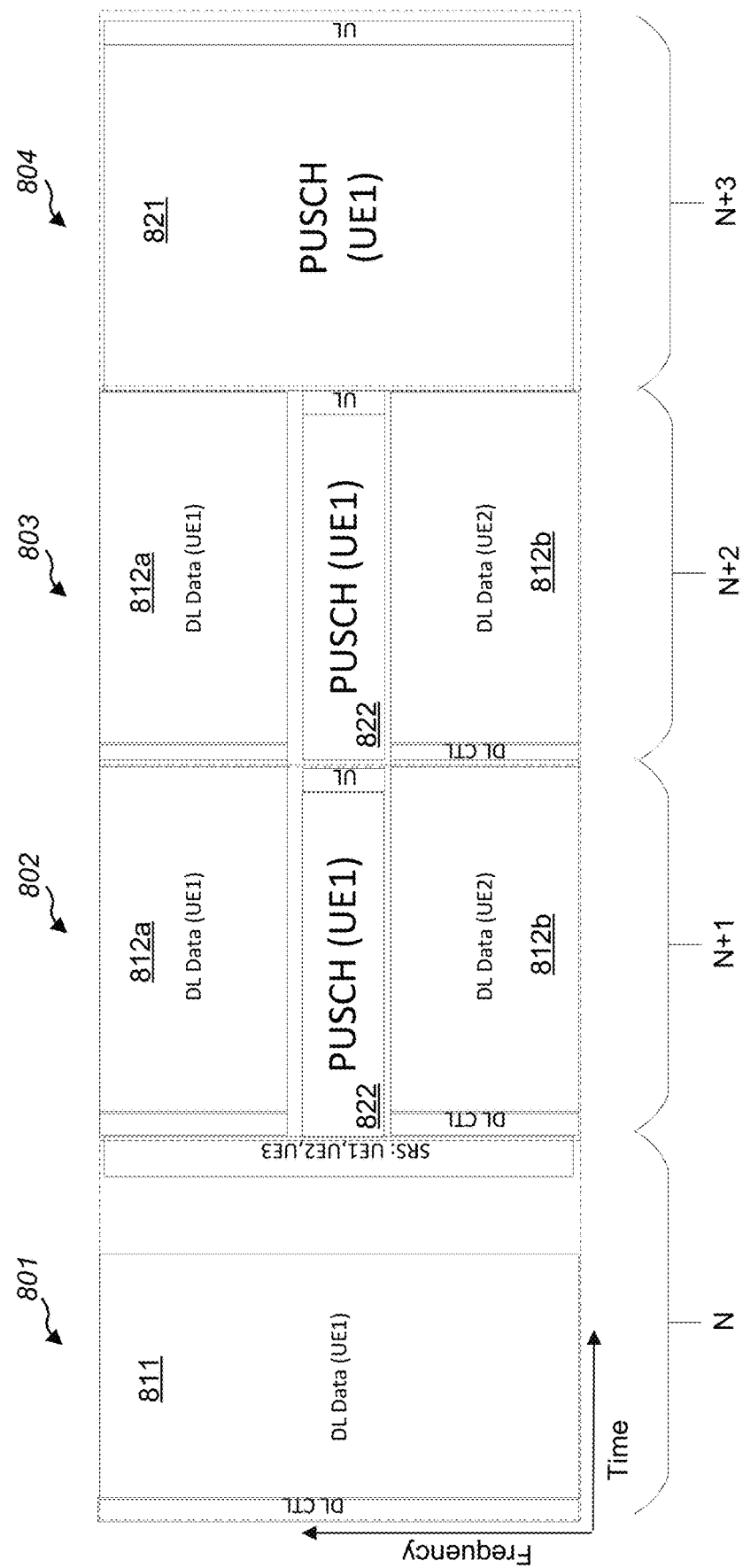
FIG. 8 shows exemplary instances of full-duplex or downlink plus uplink (D+U) slots according to aspects of the present disclosure.

FIG. 8 shows instances of full-duplex or D+U slots according to aspects of the present disclosure. In particular, D+U slots 802 and 803 are shown at times N+1 and N+2 of a frame or subframe (e.g., any of subframes 325 of FIG. 3, subframes 625 of FIGS. 6A and 6B, or subframes 725 of FIG. 7) in the example of FIG. 8. D+U slots 802 and 803 show examples in which full-duplex symbols are contained in the D+U slot (e.g., the bandwidth of BWP 812 for a component carrier is used for downlink symbol transmission and the bandwidth of BWP 822 is used for uplink symbol transmission). In communication of full-duplex symbols according to some aspects of the disclosure, a symbol may be used for uplink transmission and downlink transmission. The bandwidth of BWP 812 used for downlink transmission and the bandwidth of BWP 822 used for uplink transmission may comprise unpaired spectrum according to some aspects of the disclosure.

In contrast to the downlink and uplink transmissions of D+U slots 802 and 803, downlink slot 801, shown in the example of FIG. 8 at time N for comparison, implements a downlink slot format in which downlink only symbols are contained (e.g., the full bandwidth of BWP 811 for a component carrier is used for downlink only symbol transmission). Similarly, uplink slot 804, shown in the example of FIG. 8 at time N+3, implements an uplink slot format in which uplink only symbols are contained (e.g., the full bandwidth of BWP 821 for a component carrier is used for uplink only symbol transmission).

In a given D+U symbol, a full-duplex UE may transmit in the uplink band and/or receive in the downlink band in the same slot. For example, D+U slots 802 and 803 show an example in which UE1 (e.g., UE 115c of FIG. 4B or 4C) receives downlink symbols transmitted using portion 812a of downlink BWP 812 and transmits uplink symbols using uplink BWP 822. Similarly, in a given D+U symbol, a half-duplex UE may either transmit in the uplink band or receive in the downlink band. For example, D+U slots 802 and 803 further show an example in which UE2 (e.g., UE 115c of FIG. 4A or 115d of FIG. 4B or 4C) receives downlink symbols transmitted using portion 812b of downlink BWP 812.

As can be seen in the example of D+U slots 802 and 803, full-duplex slots implemented according to aspects of the disclosure may be utilized for uplink and/or downlink communication by multiple wireless devices (e.g., a plurality of UEs and/or a plurality of base stations) of either or both ends of the communication link. Alternatively or additionally, a full-duplex slot may be utilized for uplink and downlink communication by a single wireless device at each end of the communication link. For example, a single base station operating in full-duplex mode may communicate with multiple UEs (e.g., multiple half-duplex UEs, multiple full-duplex UEs, a combination of half-duplex and full-duplex UEs, etc.) using a full-duplex slot according to aspects of the disclosure. As another example, a single UE operating in full-duplex mode may communicate with multiple base stations (e.g., multiple half-duplex base stations, multiple full-duplex base stations, a combination of half-duplex and full-duplex base stations, etc.) using a full-duplex slot. As yet another example, a single base station operating in full-duplex mode may communicate with a single UE operating in full-duplex mode using a full-duplex slot.

Although the example full-duplex slots of D+U slots 802 and 803 show the downlink band segmented (e.g., as portions 812a and 812b of BWP 812) and the uplink band unsegmented (e.g., as BWP 822), full-duplex slots provided according to aspects of the present disclosure may have different configurations. For example, the uplink band may be segmented and/or the downlink band may be unsegmented.

The slot format of a full-duplex slot (e.g., D+U slots 802 and 803) may be determined using full-duplex-slot signaling according to aspects of the present disclosure. For example, full-duplex-slot signaling implemented according to embodiments may designate the use of a full-duplex-slot format configured to dynamically comprise or contain downlink only symbols, uplink only symbols, and/or full-duplex symbols (e.g., the slot format can adjust its symbol content, and thus may not present a static configuration of one or more symbols). For example, logic implemented by a modem, communication interface apparatus, and/or processor (e.g., controller/processor 240, transmit processor 220, receive processor 238, etc. operating to execute full-duplex-slot control logic) may populate a full-duplex-slot format in a dynamic nature (e.g., on a slot-to-slot and/or symbol-to-symbol basis) with uplink symbols, downlink symbols, and/or full-duplex symbols. Varying downlink and/or uplink symbols in a full-duplex slot enables communication flexibility and dynamic switching between downlink, uplink, or full-duplex symbols in the full-duplex slot. In some scenarios, a full-duplex slot may be used to carry downlink, uplink, and/or full-duplex symbols and maintains the ability to switch between downlink, uplink, and/or full-duplex symbols. According to some aspects, the full-duplex-slot signaling may indicate one or more symbols of a full-duplex slot as downlink only symbols, uplink only symbols, or full-duplex symbols.

Full-duplex slot configurations of the present disclosure may be indicated and/or determined using a variety of techniques. In accordance with some full-duplex-slot indication techniques, a wireless device (e.g., base station) may transmit slot signaling comprising one or more full-duplex-slot indicator parameters upon which another wireless device (e.g., UE) may base one or more full-duplex slot configuration determinations on. For example, a UE may apply one or more full-duplex-slot-indicator-parameter rules with respect to slot signaling that includes one or more full-duplex-slot-indicator parameters for determining a full-duplex-slot format implemented with respect to one or more symbols and/or slots of a communication link.

In one example, full-duplex-slot signaling may include a full-duplex-slot-format-indicator parameter configured to override (e.g., re-designate, replace, or otherwise substitute) a flexible slot and/or symbol of the wireless communication with the full-duplex slot and/or symbol. Additionally or alternatively, a full-duplex-slot-format-indicator parameter of embodiments may be configured to override a full-duplex slot of the wireless communication with the full-duplex slot (e.g., for changing the frequency domain allocation). Embodiments of a full-duplex-slot signaling parameter may further be configured to indicate the one or more symbols of the full-duplex slot as full-duplex symbols. For example, a SFI for full-duplex (e.g., SFI_FD) parameter may be introduced for use in full-duplex-slot signaling. A SFI_FD parameter implemented according to some aspects of the disclosure may comprise a bitmap, such as where a first bit or bit pattern (e.g., "0") indicates a half-duplex slot and a second bit or bit pattern (e.g., "1") indicates a full-duplex slot. Such a SFI_FD parameter may be used to dynamically override (e.g., on a slot-to-slot and/or symbol-to-symbol basis) flexible symbols and/or slots with full-duplex symbols and/or slots according to some implementations. Such a SFI_FD parameter, as may be utilized in combination with one or more other parameters (e.g., a TDD-UL-DL-ConfigurationCommon parameter and/or TDD-UL-DL-ConfigDedicated parameter), may be used for indicating/determining full-duplex slot configurations and the particular pattern and configuration of slots of a full-duplex slot (e.g., D+U slots 802 and 803).

In another example, full-duplex-slot signaling may include a full-duplex-dedicated-configuration parameter and a full-duplex-slot-format-indicator parameter configured to override a flexible slot and/or symbol (e.g., flexible formats of Table 11.1.1-1 identified above) of the wireless communication with the full-duplex slot and/or symbol. Additionally or alternatively, a full-duplex-dedicated-slot-format-indicator parameter and a full-duplex-slot-format-indicator parameter of embodiments may be configured to override a full-duplex slot of the wireless communication with the full-duplex slot (e.g., for changing the frequency domain allocation). Embodiments of full-duplex-slot signaling parameters may further be configured to indicate the one or more symbols of the full-duplex slot as downlink only symbols, uplink only symbols, or full-duplex symbols. For example, full-duplex-dedicated-configuration (e.g., TDD-UL-DL-ConfigDedicated-FD) parameter and a SFI_FD parameter may be introduced for use in full-duplex-slot signaling. In accordance with some aspects of the present disclosure, TDD-UL-DL-ConfiDedicated-FD comprises a radio resource control (RRC) parameter that indicates the number of consecutive downlink/uplink or full-duplex slots and symbols. As an example, TDD-UL-DL-ConfigDedicated-FD may contain two lists, slotSpecificConfigurationsToAddModList-FD and slotSpecificConfigurationsToReeaseList-FD for indicating downlink/uplink or full-duplex slots and symbols. Another example, TDD-UL-DL-ConfigDedicated-FD may contain a specific pattern for the slots and symbols (e.g., [DL DL DL FD FL FL UL UL UL FD]) for indicating downlink/uplink or full-duplex slots and symbols. The SFI-FD parameter may comprise a bitmap, as described above, that overwrites the TDD-UL-DL-ConfigDedicated-FD in a DCI manner which is much faster than RRC. Such TDD-UL-DL-ConfigDedicated-FD and SFI_FD parameters, as may be utilized in combination with one or more other parameters (e.g., a TDD-UL-DL-Configuration-Common parameter), may be used to dynamically override flexible symbols and/or slots with downlink symbols and/or slots, uplink symbols and/or slots, and/or full-duplex symbols and/or slots of a full-duplex slot (e.g., D+U slots 802 and 803).

In still another example, full-duplex-slot signaling may include a full-duplex-common-configuration parameter, a full-duplex-dedicated-configuration parameter, and a full-duplex-slot-format-indicator parameter configured to indicate the one or more symbols of the full-duplex slot as downlink only symbols, uplink only symbols, or full-duplex symbols of the full-duplex slot or to indicate symbols as symbols of a flexible slot. For example, a full-duplex-common-configuration (e.g., TDD-UL-DL-Configuration-Common-FD) parameter, a full-duplex-dedicated-configuration (e.g., TDD-UL-DL-ConfigDedicated-FD) parameter, and a SFI_FD parameter may be introduced for use in full-duplex-slot signaling. In accordance with some aspects of the present disclosure, TDD-UL-DL-ConfigurationCommon-FD may be a common slot configuration for all the UEs, as may be useful in various situations (e.g., in the initial connection until the UE receives a dedicated configuration). In an example, TDD-UL-DL-ConfigurationCommon-FD may comprise a set of X consecutive slots and symbols, a set of consecutive Y slots and symbols, and a set of consecutive Z slots and symbols where X, Y, and Z may be "downlink", "uplink", or "full-duplex". The TDD-UL-DL-ConfigDedicated-FD and SFI_FD parameters may be as described above. Such TDD-UL-DL-ConfigurationCommon-FD, TDD-UL-DL-ConfigDedicated-FD, and SFI_FD parameters may be utilized in configuring symbols and/or slots into downlink symbols and/or slots, uplink symbols and/or slots, flexible symbols and/or slots, and/or full-duplex symbols and/or slots of a full-duplex slot (e.g., D+U slots 802 and 803).

A full-duplex slot (e.g., D+U slot 802 and/or 803) may have different options to over-write existing slots according to some aspects of the disclosure. For example, a full-duplex slot of some embodiments may be permitted only to over-write a flexible slot. Alternatively, a full-duplex slot of embodiments may be permitted to over-write a flexible slot and an uplink and/or downlink slot. According to some embodiments, a full-duplex slot may be permitted to over-write a full-duplex slot, such as for the purpose of changing the frequency domain allocation. Embodiments of the disclosure may provide for a full-duplex slot over-writing a flexible slot, an uplink slot, a downlink slot, and a full-duplex slot or any combination thereof.

The foregoing examples of full-duplex-slot signaling may, for example, be well suited for full-duplex slot configurations utilized with respect to a TDD frame implementations. Full-duplex slots configured using the full-duplexslot signaling according to some aspects may be configured in between the downlink and uplink slots configured using a TDD-UL-DL-ConfigurationCommon parameter, such as similar to flexible slots configured using a TDD-UL-DL-ConfigDedicated parameter. Additionally or alternatively, full-duplex slots configured using the full-duplex-slot signaling of aspects may be configured anywhere in the frame.

Full-duplex slot configurations of the present disclosure may be indicated/determined using techniques in addition to or in the alternative to those described above. The below full-duplex-slot signaling techniques may, for example, be well suited for full-duplex slot configurations utilized with respect to FDD frame implementations.

In one example, full-duplex-slot signaling may utilize full-duplex-slot-format-indicator parameters comprising a plurality of slot format indicators to indicate a full-duplex-slot format. For example, a first slot format indicator (e.g., SFI_FD1) of the two slot format indicators may be used to indicate downlink symbols and/or slots while a second slot format indicator (e.g., SFI_FD2) of the two slot format indicators may be used to indicate uplink symbols and/or slots. In accordance with some aspects of the disclosure, each of the slot format indicators of the plurality of slot format indicators (e.g., SFI_FD1 and SFI_FD2) may indicate downlink symbols and/or slots, uplink symbols and/or slots, flexible symbols and/or slots, or reserved symbols and/or slots. Combinations of these different indications as between the two slot format indicators may be utilized for signaling a full-duplex-slot format of embodiments. According to a first option, if the first slot format indicator (e.g. SFI_FD1) indicates "reserved", the symbol/slot may be indicated as or determined to be a reserved symbol (e.g., not allowed for uplink or downlink transmission). According to a second option, if the first slot format indicator (e.g. SFI_FD1) indicates "reserved", the symbol/slot may be indicated as or determined to be that which is indicated (e.g., "downlink", "uplink", "flexible", or "reserved") by the second slot format indicator (e.g., SFI_FD2). If, however, the first slot format indicator (e.g. SFI_FD1) indicates "flexible", the symbol/slot may be indicated as or determined to be that which is indicated (e.g., "downlink", "uplink", "flexible", or "reserved") by the second slot format indicator (e.g., SFI_FD2). If the first slot format indicator and the second slot format indicators (e.g., SFI_FD1 and SFI_FD2) indicate "downlink"/"uplink" or "uplink"/"downlink", the symbol/slot may be indicated as or determined to be a full-duplex slot having the respective downlink and uplink parts.

The table below shows an example of use of a plurality of slot format indicators to indicate a full-duplex-slot format according to some aspects of the disclosure.

| SFI_FD1 | SFI_FD2 | Format Indicated 1$^{st}$ Option | Format Indicated 2$^{nd}$ Option |
|---|---|---|---|
| Downlink | Downlink | Downlink | Downlink |
| Downlink | Uplink | Full-duplex | Full-duplex |
| Uplink | Reserved | Reserved | Uplink |
| Uplink | Flexible | Uplink | Uplink |
| Flexible | Downlink | Downlink | Downlink |
| Flexible | Uplink | Uplink | Uplink |
| Reserved | Downlink | Reserved | Downlink |
| Reserved | Uplink | Reserved | Uplink |

Figures 9, 10:
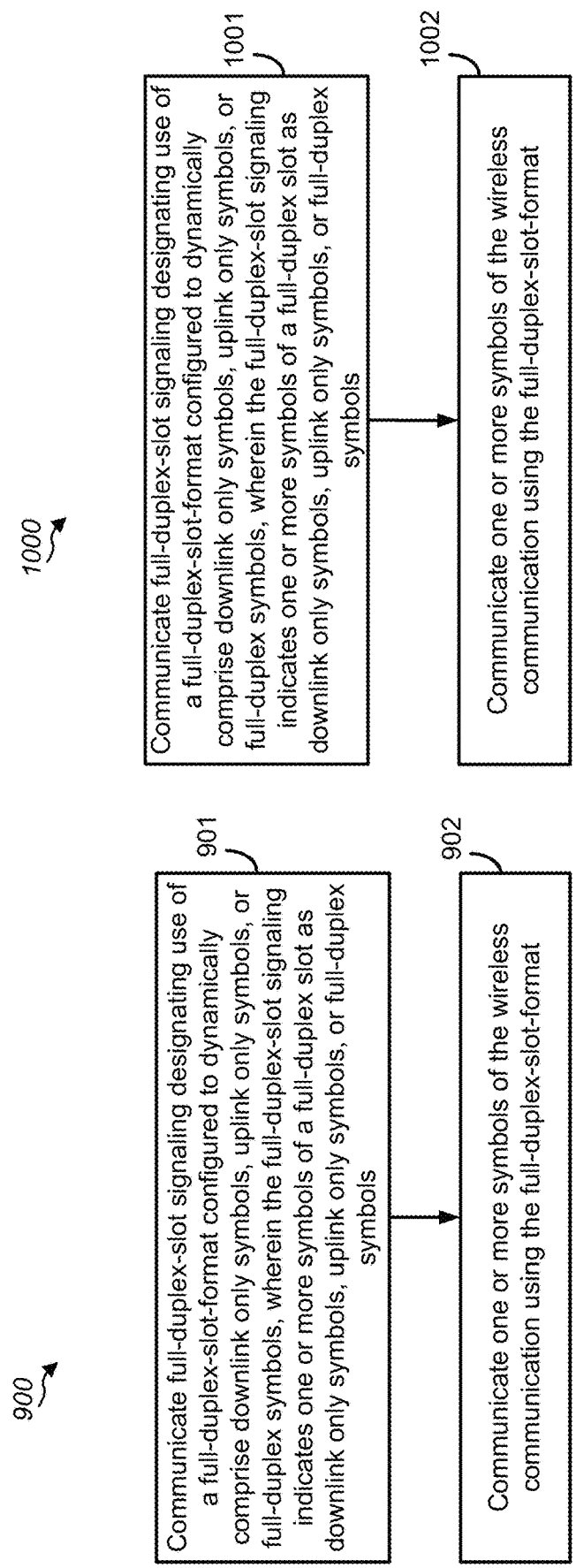
FIG. 9 is a block diagram illustrating example blocks executed by a wireless communication device, such as a base station, communicating according to a full-duplex-slot format according to some aspects of the present disclosure.
FIG. 10 is a block diagram illustrating example blocks executed by a wireless communication device, such as a UE, communicating according to a full-duplex-slot format according to some aspects of the present disclosure.
Figure 11:
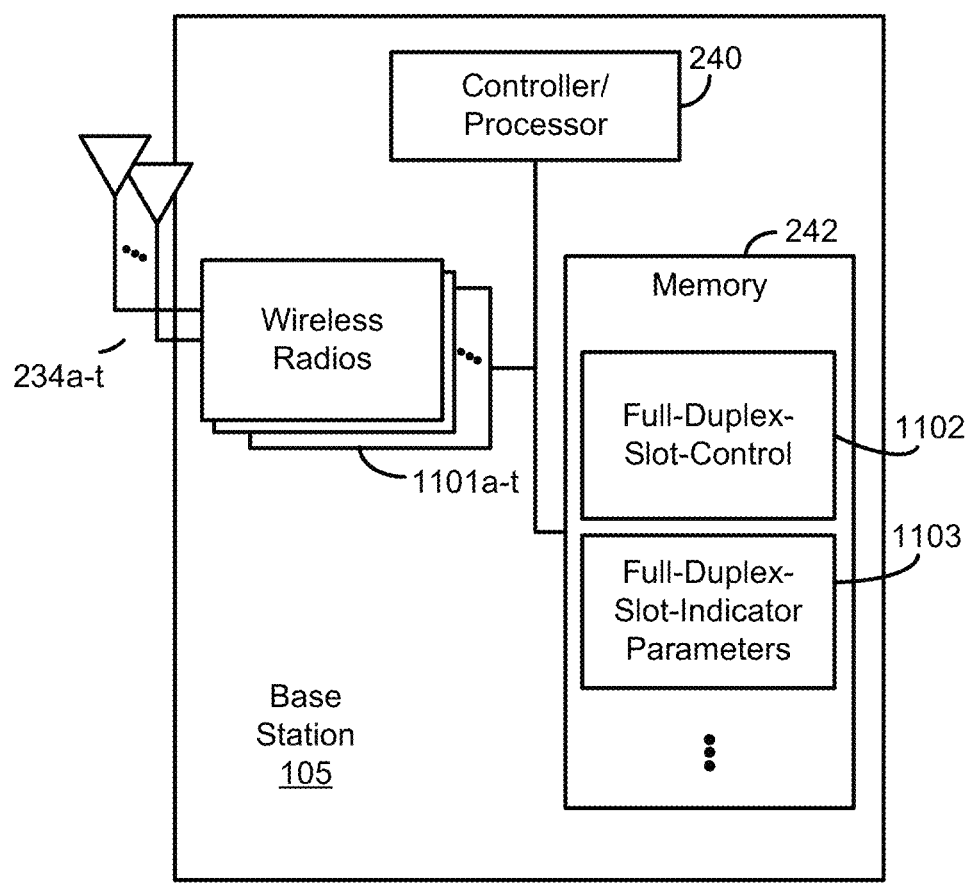
FIG. 11 is a block diagram conceptually illustrating an example design of a base station configured to communicate according to a full-duplex-slot format according to some aspects of the present disclosure.

FIG. 9 is a block diagram illustrating example blocks executed by a wireless communication device, such as a base station 105, communicating (e.g., transmitting and/or receiving) according to a full-duplex-slot format according to some aspects of the present disclosure. The example blocks will also be described with respect to base station 105 as illustrated in FIG. 11. FIG. 11 is a block diagram conceptually illustrating an example design of base station 105 configured to communicate according to a full-duplex-slot format according to some aspects of the present disclosure. Base station 105 includes the structure, hardware, and components as illustrated for base station 105 of FIG. 2. For example, base station 105 includes controller/processor 240, which operates to execute logic or computer instructions stored in memory 242, such as full-duplex-slot control logic 1102, as well as controlling the components of base station 105 that provide the features and functionality of base station 105. Base station 105, under control of controller/processor 240, transmits and receives signals via wireless radios 1101a-t and antennas 234a-t. Wireless radios 1101a-t include various components and hardware, as illustrated in FIG. 2 for base station 105, including modulator/demodulators 232a-t, MIMO detector 236, receive processor 238, transmit processor 220, and TX MIMO processor 230.

In the example operation of flow 900 of FIG. 9, at block 901, base station 105 communicates full-duplex-slot signaling designating use of a full-duplex-slot format configured to dynamically comprise downlink only symbols, uplink only symbols, or full-duplex symbols. For example, base station 105 may transmit full-duplex-slot signaling (e.g., first slot signaling) designating use of a full-duplex-slot format (e.g., a first slot format) according to some aspects of the disclosure. In accordance with some aspects of the disclosure, base station 105 may include a communications interface (e.g., antenna, RF front end, modem, etc., such as may be implemented using some or all of antennas 234a-t, modulator/demodulators 232a-t, MIMO detector 236, receive processor 238, transmit processor 220, and TX MIMO processor 230) configured to communicate full-duplex-slot signaling designating use of a full-duplex-slot format configured to dynamically comprise downlink only symbols, uplink only symbols, or full-duplex symbols. Signaling designating use of a full-duplex-slot format according to some aspects of the disclosure may directly provide or otherwise directly identify the full-duplex slot format.

The full-duplex-slot signaling may indicate one or more symbols of a full-duplex slot as downlink only symbols, uplink only symbols, or full-duplex symbols. For example, base station 105 serving one or more UEs 115 via a communication link of wireless network 100 may determine that one or more slots of the communication link are to implement a full-duplex-slot format in accordance with concepts herein. In accordance with some aspects of the disclosure, full-duplex-slot-control logic 1102 (FIG. 11) of base station 105 may determine that a full-duplex-slot format is to be implemented with respect to particular slots (e.g., based upon the capabilities of the base station, the capabilities of the one or more UEs being served, quality of service (QOS) requirements, the communication services being provided, bandwidth availability, etc.). Full-duplex-slot-control logic 1102 may, for example, determine particular symbols and/or slots for implementing a full-duplex-slot format and/or particular symbols as downlink only symbols, uplink only symbols, or full-duplex symbols of a full-duplex slot. Accordingly, the base station may transmit full-duplex-slot signaling (e.g., including one or more full-duplex-slot-format-indicator parameters, as described above, of full-duplex-slot indicator parameters database 1103) to indicate to the one or more UEs the slot or slots implementing the full-duplex-slot format. The full-duplex-slot signaling may additionally indicate symbols of the full-duplex slot as being downlink only symbols, uplink only symbols, or full-duplex symbols. The foregoing transmitting full-duplex-slot signaling may, for example, be provided via wireless radios 1101a-t, such as under control of full-duplex-slot-control logic 1102 and/or controller/processor 240. Signaling designating use of a full-duplex-slot format and indicating one or more symbols of a full-duplex slot as downlink only symbols, uplink only symbols, or full-duplex symbols according to some aspects of the disclosure may indirectly provide or otherwise indirectly identify the particular symbol types.

At block 902 of flow 900, base station 105 communicates one or more symbols of a wireless communication using the full-duplex-slot format. For example, base station 105 serving one or more UEs 115 via a communication link of wireless network 100 may transmit a symbol to a first half-duplex UE of the one or more UEs in the full-duplex slot and/or may receive a symbol from a second half-duplex UE of the one or more UEs in the full-duplex slot. Additionally or alternatively, base station 105 serving one or more UEs 115 via a communication link of wireless network 100 may transmit a symbol a full-duplex UE of the one or more UEs in the full-duplex slot and receiving a symbol from the full-duplex UE in the full-duplex slot. The foregoing transmitting and receiving may, for example, be provided via wireless radios 1101a-t, such as under control of full-duplex-slot-control logic 1102 and/or controller/processor 240.

In operation according to embodiments, full-duplex slots may be implemented according to full-duplex slot formats of embodiments dynamically, such as to meet current traffic needs. Accordingly, full-duplex-slot-control logic 1103 may provide control to switch between use of full-duplex slot formats (e.g., first slot formats) and uplink slot formats (e.g., second slot formats), downlink slot formats (e.g., third slot formats), and/or flexible slot formats (e.g., fourth slot formats).

Figure 12:
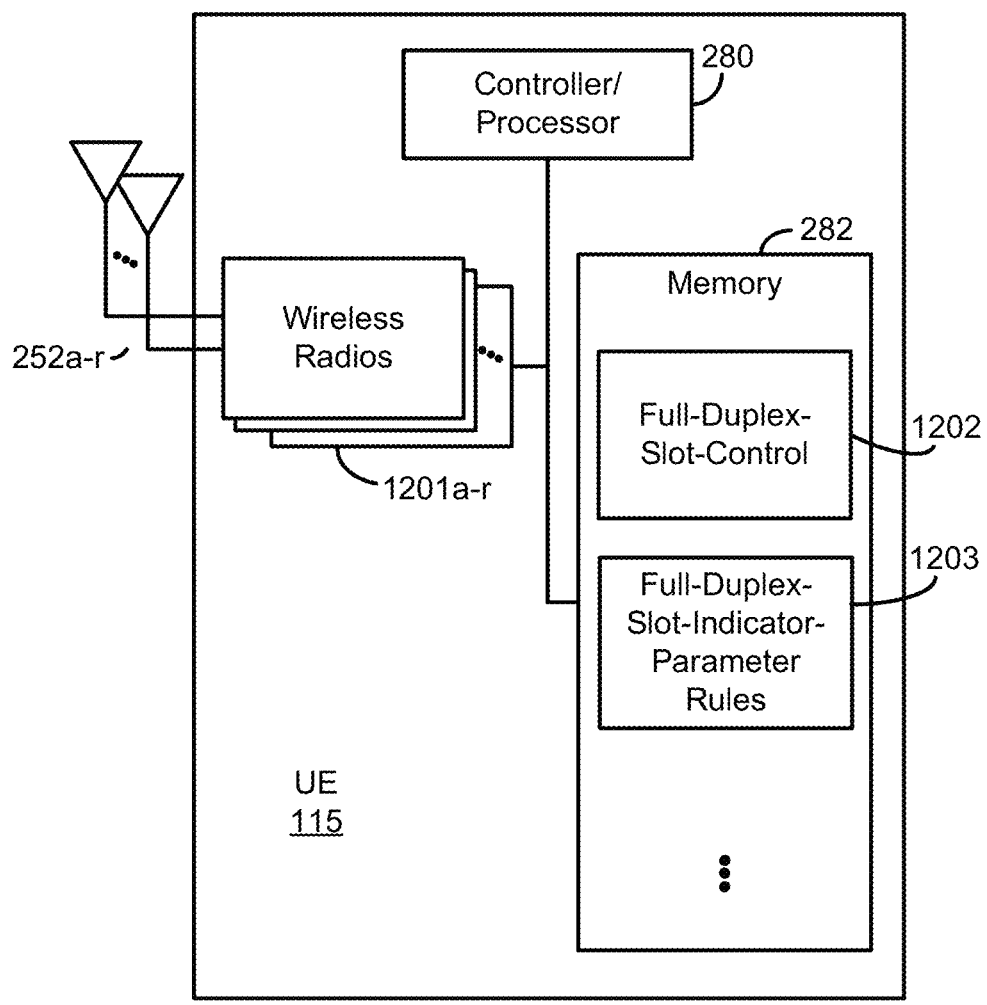
FIG. 12 is a block diagram conceptually illustrating an example design of a UE configured to communicate according to a full-duplex-slot format according to some aspects of the present disclosure.

FIG. 10 is a block diagram illustrating example blocks executed by a wireless communication device, such as a UE 115, communicating (e.g., transmitting and/or receiving) according to a full-duplex-slot format according to some aspects of the present disclosure. The example blocks will also be described with respect to UE 115 as illustrated in FIG. 12. FIG. 12 is a block diagram con conceptually illustrating an example design of UE 115 configured to communicate according to a full-duplex-slot format according to some aspects of the present disclosure. UE 115 includes the structure, hardware, and components as illustrated for UE 115 of FIG. 2. For example, UE 115 includes controller/processor 280, which operates to execute logic or computer instructions stored in memory 282, such as full-duplex-slot-control logic 1202, as well as controlling the components of UE 115 that provide the features and functionality of UE 115. UE 115, under control of controller/processor 280, transmits and receives signals via wireless radios 1201a-r and antennas 252a-r. Wireless radios 1201a-r include various components and hardware, as illustrated in FIG. 2 for UE 115, including modulator/demodulators 254a-r, MIMO detector 256, receive processor 258, transmit processor 264, and TX MIMO processor 266.

In the example operation of flow 1000 of FIG. 10, at block 1001, UE 115 communicates full-duplex-slot signaling designating use of a full-duplex-slot format configured to dynamically comprise downlink only symbols, uplink only symbols, or full-duplex symbols. For example, UE 115 may receive full-duplex-slot signaling (e.g., first slot signaling) designating use of a full-duplex-slot format (e.g., a first slot format) according to some aspects of the disclosure. In accordance with some aspects of the disclosure, UE 115 may include a communications interface (e.g., antenna, RF front end, modem, etc., such as may be implemented using some or all of antennas 252a-r, modulator/demodulators 254a-r, MIMO detector 256, receive processor 258, transmit processor 264, and TX MIMO processor 266) configured to communicate full-duplex-slot signaling designating use of a full-duplex-slot format configured to dynamically comprise downlink only symbols, uplink only symbols, or full-duplex symbols. Signaling designating use of a full-duplex-slot format according to some aspects of the disclosure may directly provide or otherwise directly identify the full-duplex slot format.

The full-duplex-slot signaling may indicate one or more symbols of a full-duplex slot as downlink only symbols, uplink only symbols, or full-duplex symbols. For example, UE 115 may be served by a base station 105 via a communication link of wireless network 100, wherein the base station may transmit full-duplex-slot signaling (e.g., including one or more full-duplex-slot-format-indicator parameters, as described above) to indicate to the UE the slot or slots implementing the full-duplex-slot format. Accordingly, UE 115 may receive full-duplex-slot signaling and full-duplex-slot-control logic 1202 may analyze the full-duplex-slot signaling to determine that a full-duplex-slot format is being utilized with respect to one or more symbols and/or slots. The foregoing receiving may, for example, be provided via wireless radios 1201a-r, such as under control of full-duplex-slot-control logic 1202 and/or controller/processor 280. According to aspects of the disclosure, full-duplex-slot-control logic 1202 may analyze the full-duplex-slot signaling to determine symbols of the full-duplex slot as being downlink only symbols, uplink only symbols, or full-duplex symbols. Full-duplex-slot-control logic 1202 may, for example, analyze one or more full-duplex-slot-format-indicator parameters of the full-duplex-slot signaling using one or more rules of full-duplex-slot-indicator-parameter rules database 1203 in making determinations regarding full-duplex symbols and/or slots. Signaling designating use of a full-duplex-slot format and indicating one or more symbols of a full-duplex slot as downlink only symbols, uplink only symbols, or full-duplex symbols according to some aspects of the disclosure may indirectly provide or otherwise indirectly identify the particular symbol types.

At block 1002 of flow 1000, UE 115 communicates one or more symbols of a wireless communication using the full-duplex-slot format. For example, a half-duplex UE 115 served by a base station 105 via a communication link of wireless network 100 may transmit a symbol in the full-duplex slot or may receive a symbol in the full-duplex slot. Additionally or alternatively, a full-duplex UE 115 served by base station 105 via a communication link of wireless network 100 may transmit a first symbol in the full-duplex slot and receive a second symbol in the full-duplex slot. The foregoing transmitting and receiving may, for example, be provided via wireless radios 1201a-r, such as under control of full-duplex-slot-control logic 1202 and/or controller/processor 280.

In operation according to embodiments, full-duplex slots may be implemented according to full-duplex slot formats of embodiments dynamically, such as to meet current traffic needs. Accordingly, full-duplex-slot-control logic 1203 may provide control to switch between use of full-duplex slot formats (e.g., first slot formats) and uplink slot formats (e.g., second slot formats), downlink slot formats (e.g., third slot formats), and/or flexible slot formats (e.g., third slot formats).

In some examples of methods, apparatuses, and articles described herein, various aspects of multi-slot transport block techniques may be implemented according to a multiplicity of combinations consistent with concepts described herein. Non-limiting examples of combinations of some aspects of a multi-slot transport block technique are set forth in the example clauses below.

1. Methods, apparatuses, and articles for wireless communication may provide for transmitting full-duplex-slot signaling designating use of a full-duplex-slot format configured to dynamically comprise downlink only symbols, uplink only symbols, or full-duplex symbols, wherein the full-duplex-slot signaling indicates one or more symbols of a full-duplex slot as downlink only symbols, uplink only symbols, or full-duplex symbols, and communicating one or more symbols of a wireless communication using the full-duplex-slot format.

2. The methods, apparatuses, and articles of clause 1, wherein the full-duplex-slot signaling indicates the one or more symbols as full-duplex symbols.

3. The methods, apparatuses, and articles of any of clauses 1-2, wherein the one or more symbols comprise in-band full-duplex symbols transmitted in overlapping frequency bands.

4. The methods, apparatuses, and articles of any of clauses 1-2, wherein the one or more symbols comprise sub-band full-duplex symbols transmitted in non-overlapping frequency bands.

5. The methods, apparatuses, and articles of any of clauses 1-4, wherein communicating the one or more symbols using the full-duplex-slot format comprises transmitting a first symbol of the one or more symbols to a first half-duplex UE in the full-duplex slot, and receiving a second symbol of the one or more symbols from a second half-duplex UE in the full-duplex slot.

6. The methods, apparatuses, and articles of any of clauses 1-4, wherein communicating the one or more symbols using the full-duplex-slot format comprises transmitting a first symbol of the one or more symbols to a full-duplex UE in the full-duplex slot, and receiving a second symbol of the one or more symbols from the full-duplex UE in the full-duplex slot.

7. The methods, apparatuses, and articles of clause 1, wherein the full-duplex-slot signaling indicates the one or more symbols as downlink symbols, wherein communicating the one or more symbols using the full-duplex-slot format comprises transmitting the one or more symbols to one or more UEs.

8. The methods, apparatuses, and articles of clause 1, wherein the full-duplex-slot signaling indicates the one or more symbols as uplink symbols, wherein communicating the one or more symbols using the full-duplex-slot format comprises receiving the one or more symbols from one or more UEs.

9. The methods, apparatuses, and articles of any of clauses 1-8, wherein the full-duplex-slot signaling includes a full-duplex-slot-format-indicator parameter configured to override at least one of a flexible slot of the wireless communication or a full-duplex slot of the wireless communication with the full-duplex slot and to indicate the one or more symbols of the full-duplex slot as full-duplex symbols.

10. The methods, apparatuses, and articles of any of clauses 1-9, wherein the full-duplex-slot signaling includes a full-duplex-dedicated-configuration parameter and a full-duplex-slot-format-indicator parameter configured to override at least one of a flexible slot of the wireless communication or a full-duplex slot of the wireless communication with the full-duplex slot and to indicate the one or more symbols of the full-duplex slot as downlink only symbols, uplink only symbols, or full-duplex symbols.

11. The methods, apparatuses, and articles of any of clauses 1-10, wherein the full-duplex-slot signaling includes a full-duplex-common-configuration parameter, a full-duplex-dedicated-configuration parameter, and a full-duplex-slot-format-indicator parameter configured to indicate the one or more symbols of the full-duplex slot as downlink only symbols, uplink only symbols, or full-duplex symbols of the full-duplex slot or to indicate symbols as symbols of a flexible slot.

12. The methods, apparatuses, and articles of any of clauses 1-11, wherein the full-duplex-slot signaling indicates that another slot format is being overridden with the full-duplex-slot format.

13. The methods, apparatuses, and articles of clause 12, wherein the overridden slot format is a single slot format.

14. The methods, apparatuses, and articles of clause 13, wherein the single slot formation is a flexible slot format.

15. The methods, apparatuses, and articles of clause 12, wherein the overridden slot format includes a plurality of slot formats.

16. The methods, apparatuses, and articles of clause 15, wherein the plurality of slot formats includes a flexible slot format and at least one of a uplink slot format or a downlink slot format.

17. The methods, apparatuses, and articles of any of clauses 1-16, wherein communicating the one or more symbols using the full-duplex-slot format is performed between downlink and uplink slots of TDD frame.

18. The methods, apparatuses, and articles of any of clauses 1-16, wherein communicating the one or more symbols using the full-duplex-slot format may be performed anywhere in a TDD frame.

19. The methods, apparatuses, and articles of any of clauses 1-18, wherein the full-duplex-slot signaling includes a plurality of slot-format-indication parameters.

20. The methods, apparatuses, and articles of clause 19, wherein the plurality of slot-format-indication parameters includes a first slot-format-indication parameter for downlink symbols and a second slot-format-indication parameter for uplink symbols.

21. The methods, apparatuses, and articles of clause 20, wherein the first and second slot-format-indication parameters are each configured to indicate either downlink symbol, uplink symbol, flexible symbol, or reserved symbol.

22. The methods, apparatuses, and articles of clause 20, wherein the first slot-format-indication parameter is set as reserved symbol and the full-duplex slot is indicated as not allowed for at least one of uplink or downlink symbols.

23. The methods, apparatuses, and articles of clause 20, wherein the first slot-format-indication parameter is set as reserved symbol and the full-duplex slot is indicated according to the second slot-format-indication parameter.

24. The methods, apparatuses, and articles of clause 20, wherein the first slot-format-indication parameter is set as flexible symbol and the full-duplex slot is indicated according to the second slot-format-indication parameter.

25. The methods, apparatuses, and articles of clause 20, wherein the full-duplex slot is indicated by the first slot-format-indication parameter set as one of either downlink symbol or uplink symbol and the second slot-format-indication parameter set as a second the other one of the uplink symbol.

26. Methods, apparatuses, and articles for wireless communication may provide for receiving full-duplex-slot signaling designating use of a full-duplex-slot format configured to dynamically comprise downlink only symbols, uplink only symbols, or full-duplex symbols, wherein the full-duplex-slot signaling indicates one or more symbols of a full-duplex slot as downlink only symbols, uplink only symbols, or full-duplex symbols, and communicating one or more symbols of a wireless communication using the full-duplex-slot format.

27. The methods, apparatuses, and articles of clause 26, wherein the full-duplex-slot signaling indicates the one or more symbols as full-duplex symbols.

28. The methods, apparatuses, and articles of any of clauses 26-27, wherein symbols of the full-duplex slot comprise in-band full-duplex symbols transmitted in overlapping frequency bands.

29. The methods, apparatuses, and articles of any of clauses 26-27, wherein symbols of the full-duplex slot comprise sub-band full-duplex symbols transmitted in non-overlapping frequency bands.

30. The methods, apparatuses, and articles of any of clauses 26-29, wherein communicating the one or more symbols using the full-duplex-slot format comprises transmitting, by a first half-duplex UE, a first symbol of the one or more symbols in the full-duplex slot.

31. The methods, apparatuses, and articles of any of clauses 26-29, wherein communicating the one or more symbols using the full-duplex-slot format comprises transmitting, a full-duplex UE, a first symbol of the one or more symbols in the full-duplex slot, and receiving, by the full-duplex UE, a second symbol of the one or more symbols in the full-duplex slot.

32. The methods, apparatuses, and articles of any of clauses 26-31, wherein the full-duplex-slot signaling indicates the one or more symbols as downlink symbols, wherein communicating the one or more symbols using the full-duplex-slot format comprises receiving the one or more symbols.

33. The methods, apparatuses, and articles of any of clauses 26-31, wherein the full-duplex-slot signaling indicates the one or more symbols as uplink symbols, wherein communicating the one or more symbols using the full-duplex-slot format comprises transmitting the one or more symbols.

34. The methods, apparatuses, and articles of any of clauses 26-31, wherein the full-duplex-slot signaling includes a full-duplex-slot-format-indicator parameter configured to override at least one of a flexible slot of the wireless communication or a full-duplex slot of the wireless communication with the full-duplex slot and to indicate the one or more symbols of the full-duplex slot as full-duplex symbols.

35. The methods, apparatuses, and articles of any of clauses 26-34, wherein the full-duplex-slot signaling includes a full-duplex-dedicated-configuration parameter and a full-duplex-slot-format-indicator parameter configured to override at least one of a flexible slot of the wireless communication or a full-duplex slot of the wireless communication with the full-duplex slot and to indicate the one or more symbols of the full-duplex slot as downlink only symbols, uplink only symbols, or full-duplex symbols.

36. The methods, apparatuses, and articles of any of clauses 26-35, wherein the full-duplex-slot signaling includes a full-duplex-common-configuration parameter, a full-duplex-dedicated-configuration parameter, and a full-duplex-slot-format-indicator parameter configured to indicate the one or more symbols of the full-duplex slot as downlink only symbols, uplink only symbols, or full-duplex symbols of the full-duplex slot or to indicate symbols as symbols of a flexible slot.

37. The methods, apparatuses, and articles of any of clauses 26-36, wherein the full-duplex-slot signaling indicates that another slot format is being overridden with the full-duplex-slot format.

38. The methods, apparatuses, and articles of clause 37, wherein the overridden slot format includes a single slot format.

39. The methods, apparatuses, and articles of clause 38, wherein the single slot format is a flexible slot format.

40. The methods, apparatuses, and articles of clause 37, wherein the overridden slot format includes a plurality of slot formats.

41. The methods, apparatuses, and articles of clause 40, wherein the plurality of slot formats includes a flexible slot format and at least one of a uplink slot format or a downlink slot format.

42. The methods, apparatuses, and articles of any of clauses 26-41, wherein communicating the one or more symbols using the full-duplex-slot format is performed between downlink and uplink slots of TDD frame.

43. The methods, apparatuses, and articles of any of clauses 26-41, wherein communicating the one or more symbols using the full-duplex-slot format may be performed anywhere in a TDD frame.

44. The methods, apparatuses, and articles of any of clauses 26-41, wherein the full-duplex-slot signaling includes a plurality of slot-format-indication parameters.

45. The methods, apparatuses, and articles of clause 44, wherein the plurality of slot-format-indication parameters includes a first slot-format-indication parameter for downlink symbols and a second slot-format-indication parameter for uplink symbols.

46. The methods, apparatuses, and articles of clause 45, wherein the first and second slot-format-indication parameters are each configured to indicate either downlink symbol, uplink symbol, flexible symbol, or reserved symbol.

47. The methods, apparatuses, and articles of clause 45, wherein the first slot-format-indication parameter is set as reserved symbol and the full-duplex slot is indicated as not allowed for at least one of uplink or downlink symbols.

48. The methods, apparatuses, and articles of clause 45, wherein the first slot-format-indication parameter is set as reserved symbol and the full-duplex slot is indicated according to the second slot-format-indication parameter.

49. The methods, apparatuses, and articles of clause 45, wherein the first slot-format-indication parameter is set as flexible symbol and the full-duplex slot is indicated according to the second slot-format-indication parameter.

50. The methods, apparatuses, and articles of clause 45, wherein the full-duplex slot is indicated by the first slot-format-indication parameter set as one of either downlink symbol or uplink symbol and the second slot-format-indication parameter set as a second the other one of the uplink symbol.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to full-duplex slot formats may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 9 and 10) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication by a wireless communication device, comprising:
communicating full-duplex-slot signaling designating use of a full-duplex-slot format, wherein each symbol communicated using the full-duplex-slot format is configurable to contain a downlink only symbol, an uplink only symbol, or a full-duplex symbol, wherein the full-duplex-slot signaling indicates that another slot format is being overridden with the full-duplex-slot format;
communicating one or more full-duplex-slot parameters indicating a respective symbol to be communicated according to the full-duplex-slot format as downlink only, uplink only, or full-duplex; and communicating, using the full-duplex-slot format, one or more symbols as downlink only symbols, uplink only symbols, or full-duplex symbols in accordance with the one or more full-duplex-slot parameters.

2. The method of claim 1, wherein a full-duplex-slot parameter of the one or more full-duplex-slot parameters dynamically indicates the respective symbol as full-duplex.

3. The method of claim 2, wherein the respective symbol is communicated as a sub-band full-duplex symbol transmitted in nonoverlapping frequency bands.

4. The method of claim 2, wherein the respective symbol is communicated as an in-band full-duplex symbol transmitted in overlapping frequency bands.

5. The method of claim 1, wherein the communicating one or more full-duplex-slot parameters dynamically indicates symbol formats on a symbol-to-symbol basis.

6. The method of claim 1, wherein the slot format being overridden is a flexible slot format, an uplink slot, or a downlink slot.

7. The method of claim 1, wherein the slot format being overridden is a full-duplex-slot format, the full-duplex-slot format being communicated changing frequency domain allocation of the full-duplex-slot format being overridden.

8. The method of claim 1, wherein the full-duplex-slot signaling includes a full-duplex-dedicated-configuration parameter configured to override the another slot format with the full-duplex-slot format.

9. The method of claim 1, wherein the full-duplex-slot parameters include a plurality of slot-format-indication parameters for each respective symbol.

10. The method of claim 9, wherein a first slot-format-indication parameter of the plurality of slot-format-indication parameters is set as reserved symbol and the respective symbol is indicated as not allowed for at least one of uplink or downlink symbols.

11. The method of claim 9, wherein a first slot-format-indication parameter of the plurality of slot-format-indication parameters is set as reserved symbol and the respective symbol is indicated according to a corresponding second slot-format-indication parameter of the plurality of slot-format-indication parameters.

12. The method of claim 9, wherein a first slot-format-indication parameter of the plurality of slot-format-indication parameters is set as flexible symbol and the respective symbol is indicated according to a corresponding second slot-format-indication parameter of the plurality of slot-format-indication parameters.

13. The method of claim 9, wherein a first slot-format-indication parameter of the plurality of slot-format-indication parameters is set as downlink symbol, a corresponding second slot-format-indication parameter of the plurality of slot-format-indication parameters is set as uplink symbol, and the respective symbol is indicated as full-duplex.

14. The method of claim 9, wherein a first slot-format-indication parameter of the plurality of slot-format-indication parameters is set as uplink symbol, a corresponding second slot-format-indication parameter of the plurality of slot-format-indication parameters is set as downlink symbol, and the respective symbol is indicated as full-duplex.

15. An apparatus configured for wireless communication, the apparatus comprising:
a processing system that includes one or more processors and one or more memories coupled to the one or more processors, wherein the processing system is configured to cause the apparatus to:
communicate full-duplex-slot signaling designating use of a full-duplex-slot format, wherein each symbol communicated using the full-duplex-slot format is configurable to contain a downlink only symbol, an uplink only symbol, or a full-duplex symbol, wherein the full-duplex-slot signaling indicates that another slot format is being overridden with the full-duplex-slot format;
communicate one or more full-duplex-slot parameters indicating a respective symbol to be communicated according to the full-duplex-slot format as downlink only, uplink only, or full-duplex; and
communicate, using the full-duplex-slot format, one or more symbols as downlink only symbols, uplink only symbols, or full-duplex symbols in accordance with the one or more full-duplex-slot parameters.

16. The apparatus of claim 15, wherein a full-duplex-slot parameter of the one or more full-duplex-slot parameters dynamically indicates the respective symbol as full-duplex and the respective symbol is communicated as a sub-band full-duplex symbol transmitted in nonoverlapping frequency bands.

17. The apparatus of claim 15, wherein a full-duplex-slot parameter of the one or more full-duplex-slot parameters dynamically indicates the respective symbol as full-duplex and the respective symbol is communicated as an in-band full-duplex symbol transmitted in overlapping frequency bands.

18. The apparatus of claim 15, wherein the one or more full-duplex-slot parameters dynamically indicate symbol formats on a symbol-to-symbol basis.

19. A non-transitory computer-readable medium having program code for wireless communication recorded thereon, the program code comprising:
program code executable by a processor for causing a wireless communication device to:
communicate full-duplex-slot signaling designating use of a full-duplex-slot format, wherein each symbol communicated using the full-duplex-slot format is configurable to contain a downlink only symbol, an uplink only symbol, or a full-duplex symbol, wherein the full-duplex-slot signaling indicates that another slot format is being overridden with the full-duplex-slot format;
communicate one or more full-duplex-slot parameters indicating a respective symbol to be communicated according to the full-duplex-slot format as downlink only, uplink only, or full-duplex; and
communicate, using the full-duplex-slot format, one or more symbols as downlink only symbols, uplink only symbols, or full-duplex symbols in accordance with the one or more full-duplex-slot parameters.

* * * * *